(12) United States Patent
Ott et al.

(10) Patent No.: US 12,508,665 B2
(45) Date of Patent: Dec. 30, 2025

(54) AUTONOMOUS ASSEMBLY ROBOTS

(71) Applicant: Path Robotics, Inc., Columbus, OH (US)

(72) Inventors: Jordan Ott, Dublin, OH (US); Madhavun Candadai, Dublin, OH (US); Colin Bunker, Columbus, OH (US); Sabhari Natrajan, Columbus, OH (US); Alexander Lonsberry, Gahanna, OH (US); Andrew Lonsberry, Columbus, OH (US)

(73) Assignee: PATH ROBOTICS, INC., Columbus, OH (US)

(*) Notice: Subject to any disclaimer, the term of this patent is extended or adjusted under 35 U.S.C. 154(b) by 0 days.

(21) Appl. No.: 17/893,657

(22) Filed: Aug. 23, 2022

(65) Prior Publication Data

US 2023/0330764 A1 Oct. 19, 2023

Related U.S. Application Data

(60) Provisional application No. 63/332,416, filed on Apr. 19, 2022.

(51) Int. Cl.
*B23K 9/12* (2006.01)
*B25J 9/00* (2006.01)

(52) U.S. Cl.
CPC .............. *B23K 9/12* (2013.01); *B25J 9/0084* (2013.01)

(58) Field of Classification Search
CPC ................................ B25J 9/0084; B23K 9/12
USPC ....................................................... 219/124.1
See application file for complete search history.

(56) References Cited

U.S. PATENT DOCUMENTS

| | | | |
|---|---|---|---|
| 3,532,807 A | 10/1970 | Wall, Jr. et al. | |
| 4,011,437 A | 3/1977 | Hohn | |
| 4,021,840 A | 5/1977 | Ellsworth et al. | |
| 4,148,061 A | 4/1979 | Lemelson | |

(Continued)

FOREIGN PATENT DOCUMENTS

| JP | 223604 | 12/2015 |
|---|---|---|
| JP | 2022045155 A | 3/2022 |

(Continued)

OTHER PUBLICATIONS

Translation CN 110064818 (Year: 2023).*

(Continued)

*Primary Examiner* — Steven W Crabb
(74) *Attorney, Agent, or Firm* — IPkey PLLC

(57) ABSTRACT

This disclosure provides systems, methods, and apparatuses, including computer programs encoded on computer storage media, for operation of an assembly robotic system. In one aspect of the disclosure, the assembly robotic system includes a tool coupled to a robot device and configured to be selectively coupled to a first object. The assembly robotic system also includes a welding tool, one or more sensors configured to generate sensor data, and a controller. The controller is configured to control the tool to couple the tool to the first object based on the sensor data, control the robot device to bring the first object into a spatial relationship with a second object, and generate a weld instruction to cause the weld tool to weld a seam formed between the first and second objects. Other aspects and features are also claimed and described.

21 Claims, 12 Drawing Sheets

(56) References Cited

U.S. PATENT DOCUMENTS

| | | |
|---|---|---|
| 4,255,643 A | 3/1981 | Balfanz |
| 4,380,696 A | 4/1983 | Masaki |
| 4,412,121 A | 10/1983 | Kremers et al. |
| 4,482,968 A | 11/1984 | Inaba et al. |
| 4,492,847 A | 1/1985 | Masaki et al. |
| 4,495,588 A | 1/1985 | Nio et al. |
| 4,497,019 A | 1/1985 | Waber |
| 4,497,996 A | 2/1985 | Libby et al. |
| 4,515,521 A | 5/1985 | Takeo et al. |
| 4,553,077 A | 11/1985 | Brantmark et al. |
| 4,555,613 A | 11/1985 | Shulman |
| 4,561,050 A | 12/1985 | Iguchi et al. |
| 4,567,348 A | 1/1986 | Smith et al. |
| 4,575,304 A | 3/1986 | Nakagawa et al. |
| 4,578,554 A | 3/1986 | Coulter |
| 4,580,229 A | 4/1986 | Koyama et al. |
| 4,587,396 A | 5/1986 | Rubin |
| 4,590,577 A | 5/1986 | Nio et al. |
| 4,593,173 A | 6/1986 | Bromley et al. |
| 4,595,989 A | 6/1986 | Yasukawa et al. |
| 4,613,942 A | 9/1986 | Chen |
| 4,616,121 A | 10/1986 | Clocksin et al. |
| 4,617,504 A | 10/1986 | Detriche |
| 4,642,752 A | 2/1987 | Debarbieri et al. |
| 4,652,803 A | 3/1987 | Kamejima et al. |
| 4,675,502 A | 6/1987 | Haefner et al. |
| 4,677,568 A | 6/1987 | Arbter |
| 4,685,862 A | 8/1987 | Nagai et al. |
| 4,724,301 A | 2/1988 | Shibata et al. |
| 4,725,965 A | 2/1988 | Keenan |
| 4,744,039 A | 5/1988 | Suzuki et al. |
| 4,745,857 A | 5/1988 | Putnam et al. |
| 4,757,180 A * | 7/1988 | Kainz .................. B23K 9/1336 |
| | | 219/136 |
| 4,804,860 A | 2/1989 | Ross et al. |
| 4,812,614 A | 3/1989 | Wang et al. |
| 4,833,383 A | 5/1989 | Skarr et al. |
| 4,833,624 A | 5/1989 | Kuwahara et al. |
| 4,837,487 A | 6/1989 | Kurakake et al. |
| 4,845,992 A | 7/1989 | Dean |
| 4,899,095 A | 2/1990 | Kishi et al. |
| 4,906,907 A | 3/1990 | Tsuchihashi et al. |
| 4,907,169 A | 3/1990 | Lovoi |
| 4,924,063 A | 5/1990 | Buchel et al. |
| 4,945,493 A | 7/1990 | Huang et al. |
| 4,969,108 A | 11/1990 | Webb et al. |
| 4,973,216 A | 11/1990 | Domm |
| 5,001,324 A | 3/1991 | Aiello et al. |
| 5,006,999 A | 4/1991 | Kuno et al. |
| 5,053,976 A | 10/1991 | Nose et al. |
| 5,083,073 A | 1/1992 | Kato |
| 5,096,353 A | 3/1992 | Tesh et al. |
| 5,154,717 A | 10/1992 | Matsen, III et al. |
| 5,159,745 A | 11/1992 | Kato |
| 5,219,264 A | 6/1993 | McClure et al. |
| 5,245,409 A | 9/1993 | Tobar |
| 5,288,991 A | 2/1994 | King et al. |
| 5,300,869 A | 4/1994 | Skaar et al. |
| 5,329,469 A | 7/1994 | Watanabe |
| 5,379,721 A | 1/1995 | Dessing et al. |
| 5,457,773 A | 10/1995 | Jeon |
| 5,465,037 A | 11/1995 | Huissoon et al. |
| 5,479,078 A | 12/1995 | Karakama et al. |
| 5,511,007 A | 4/1996 | Nihei et al. |
| 5,532,924 A | 7/1996 | Hara et al. |
| 5,570,458 A | 10/1996 | Umeno et al. |
| 5,572,102 A | 11/1996 | Goodfellow et al. |
| 5,600,760 A | 2/1997 | Pryor |
| 5,602,967 A | 2/1997 | Pryor |
| 5,608,847 A | 3/1997 | Pryor |
| 5,612,785 A | 3/1997 | Boillot et al. |
| 5,828,566 A | 10/1998 | Pryor |
| 5,906,761 A | 5/1999 | Gilliland et al. |
| 5,925,268 A | 7/1999 | Britnell |
| 5,956,417 A | 9/1999 | Pryor |
| 5,959,425 A | 9/1999 | Bieman et al. |
| 5,961,858 A | 10/1999 | Britnell |
| 6,035,695 A | 3/2000 | Kim |
| 6,044,308 A * | 3/2000 | Huissoon ................ B25J 9/1692 |
| | | 700/254 |
| 6,049,059 A | 4/2000 | Kim |
| 6,084,203 A | 7/2000 | Bonigen |
| 6,163,946 A | 12/2000 | Pryor |
| 6,167,607 B1 | 1/2001 | Pryor |
| 6,304,050 B1 | 10/2001 | Skaar et al. |
| 6,430,474 B1 | 8/2002 | DiStasio et al. |
| 6,804,580 B1 * | 10/2004 | Stoddard ................ B25J 9/1669 |
| | | 318/568.13 |
| 7,130,718 B2 | 10/2006 | Gunnarsson et al. |
| 7,151,848 B1 | 12/2006 | Watanabe et al. |
| 7,734,358 B2 | 6/2010 | Watanabe et al. |
| 7,805,219 B2 | 9/2010 | Ishikawa et al. |
| 7,813,830 B2 | 10/2010 | Summers et al. |
| 7,818,091 B2 | 10/2010 | Kazi et al. |
| 7,946,439 B1 | 5/2011 | Toscano et al. |
| 8,494,678 B2 | 7/2013 | Quandt et al. |
| 8,525,070 B2 | 9/2013 | Tanaka et al. |
| 8,538,125 B2 | 9/2013 | Linnenkohl et al. |
| 8,644,984 B2 | 2/2014 | Nagatsuka et al. |
| 9,067,321 B2 | 6/2015 | Landsnes |
| 9,221,117 B2 | 12/2015 | Conrardy et al. |
| 9,221,137 B2 | 12/2015 | Otts |
| 9,666,160 B2 | 5/2017 | Patel et al. |
| 9,685,099 B2 | 6/2017 | Boulware et al. |
| 9,773,429 B2 | 9/2017 | Boulware et al. |
| 9,802,277 B2 * | 10/2017 | Beatty ................ B23K 37/0538 |
| 9,821,415 B2 | 11/2017 | Rajagopalan et al. |
| 9,836,987 B2 | 12/2017 | Postlethwaite et al. |
| 9,937,577 B2 | 4/2018 | Daniel et al. |
| 9,975,196 B2 | 5/2018 | Zhang et al. |
| 9,977,242 B2 | 5/2018 | Patel et al. |
| 9,993,891 B2 | 6/2018 | Wiryadinata |
| 10,040,141 B2 | 8/2018 | Rajagopalan et al. |
| 10,083,627 B2 | 9/2018 | Daniel et al. |
| 10,191,470 B2 | 1/2019 | Inoue |
| 10,197,987 B2 | 2/2019 | Battles et al. |
| 10,198,962 B2 | 2/2019 | Postlethwaite et al. |
| 10,201,868 B2 | 2/2019 | Dunahoo et al. |
| 11,034,024 B2 * | 6/2021 | Saez ...................... B25J 9/1682 |
| 11,067,965 B2 | 7/2021 | Spieker et al. |
| 2001/0004718 A1 | 6/2001 | Gilliland et al. |
| 2004/0105519 A1 | 6/2004 | Yamada et al. |
| 2006/0047363 A1 | 3/2006 | Farrelly et al. |
| 2006/0049153 A1 | 3/2006 | Cahoon et al. |
| 2008/0125893 A1 | 5/2008 | Tilove et al. |
| 2009/0075274 A1 | 3/2009 | Slepnev et al. |
| 2009/0139968 A1 | 6/2009 | Hesse et al. |
| 2010/0114338 A1 | 5/2010 | Bandyopadhyay et al. |
| 2010/0152870 A1 | 6/2010 | Wanner et al. |
| 2010/0206938 A1 | 8/2010 | Quandt et al. |
| 2010/0274390 A1 | 10/2010 | Bernd |
| 2011/0141251 A1 * | 6/2011 | Marks ...................... G06T 7/11 |
| | | 348/222.1 |
| 2011/0297666 A1 | 12/2011 | Ihle et al. |
| 2012/0096702 A1 * | 4/2012 | Kingsley ................ B23P 23/04 |
| | | 29/561 |
| 2012/0267349 A1 | 10/2012 | Berndl et al. |
| 2013/0119040 A1 | 5/2013 | Suraba et al. |
| 2013/0259376 A1 * | 10/2013 | Louban .................... G06T 7/66 |
| | | 382/173 |
| 2014/0088577 A1 | 3/2014 | Anastassiou et al. |
| 2014/0100694 A1 | 4/2014 | Rueckl et al. |
| 2015/0122781 A1 | 5/2015 | Albrecht et al. |
| 2015/0127162 A1 | 5/2015 | Takefumi |
| 2016/0096269 A1 | 4/2016 | Atohira et al. |
| 2016/0125592 A1 | 5/2016 | Becker et al. |
| 2016/0125593 A1 * | 5/2016 | Becker ...................... H04N 7/18 |
| | | 348/90 |
| 2016/0224012 A1 * | 8/2016 | Hunt .................. G05B 19/4061 |
| 2017/0072507 A1 * | 3/2017 | Legault .................. B23K 9/173 |
| 2017/0132807 A1 | 5/2017 | Shivaram et al. |
| 2017/0232615 A1 * | 8/2017 | Hammock ........... B23K 26/032 |
| | | 700/119 |
| 2017/0266758 A1 * | 9/2017 | Fukui .................... B23K 26/042 |

(56) References Cited

U.S. PATENT DOCUMENTS

| | | | |
|---|---|---|---|
| 2017/0364076 A1 | 12/2017 | Keshmiri et al. | |
| 2017/0368649 A1* | 12/2017 | Marrocco | B25J 9/1687 |
| 2018/0117701 A1 | 5/2018 | Ge et al. | |
| 2018/0147662 A1* | 5/2018 | Furuya | B23K 37/0235 |
| 2018/0266961 A1 | 9/2018 | Narayanan et al. | |
| 2018/0266967 A1* | 9/2018 | Ohno | G01B 11/0666 |
| 2018/0322623 A1 | 11/2018 | Memo et al. | |
| 2019/0108639 A1* | 4/2019 | Tchapmi | G06T 1/20 |
| 2019/0193180 A1* | 6/2019 | Troyer | B23K 9/295 |
| 2019/0240759 A1 | 8/2019 | Ennsbrunner et al. | |
| 2020/0030984 A1* | 1/2020 | Suzuki | B25J 9/1692 |
| 2020/0114449 A1* | 4/2020 | Chang | B23K 9/32 |
| 2020/0130089 A1 | 4/2020 | Ivkovich et al. | |
| 2020/0180062 A1* | 6/2020 | Suzuki | B23K 35/0266 |
| 2020/0223064 A1 | 7/2020 | Alexander | |
| 2020/0262079 A1* | 8/2020 | Saez et al. | B25J 9/1687 |
| 2020/0409376 A1 | 12/2020 | Afrouzi et al. | |
| 2022/0266453 A1 | 8/2022 | Lonsberry et al. | |
| 2022/0305593 A1 | 9/2022 | Lonsberry et al. | |
| 2022/0402147 A1 | 12/2022 | Martin et al. | |

FOREIGN PATENT DOCUMENTS

| | | |
|---|---|---|
| WO | WO 2017/115015 | 7/2017 |
| WO | WO 2018/173655 | 9/2018 |
| WO | WO 2019/153090 | 8/2019 |

OTHER PUBLICATIONS

JP2010269336 (Year: 2023).*
WO9403303 (Year: 2023).*
JP2017196653 (Year: 2023).*
WO2016013171 (Year: 2023).*
WO2004096481 (Year: 2023).*
JP2015223604 (Year: 2023).*
JP2015140171 (Year: 2023).*
International Search Report and Written Opinion in International Patent Application No. PCT/US2022/017744, dated Jun. 14, 2022.
International Search Report and Written Opinion in International Patent Application No. PCT/US2022/017741, dated Jul. 25, 2022.
Lynch, K.M. et al., "Robot Control", *Modern Robotics: Mechanics, Planning, and Control*, Cambridge University Press, 2017, 403-460.
Natarajan, S. et al., "Aiding Grasp Synthesis for Novel Objects Using Heuristic-Based and Data-Driven Active Vision Methods", *Frontiers in Robotics and AI*, 8:696587, 2021.
Moos, et al. "Resistance spot welding process simulation for variational analysis on compliant assemblies", *Journal of Manufacturing Systems* vol. 7, pp. 44-71, 2013.
International Search Report and Written Opinion issued in corresponding PCT Application No. PCT/US2023/019063, mailed Sep. 12, 2023.
Invitation to Pay Additional Fees and, Where Applicable, Protest Fee and Partial International Search Report issued in International Patent Application No. PCT/US2023/019063, dated Jul. 18, 2023 (11 pages).
U.S. Appl. No. 11/179,793, filed Nov. 23, 2021, Atherton, et al.
Hong et al., "Online Extraction of Pose Infromation of 3D Zigzag-Line Welding Seams for Welding Seam Tracking", Sensors 2021, 21, 375.
Larkin et al., "3D Mapping using a ToF Camera for Self Programming an Industrial Robot", (2013) 2013 IEEE/ASME International Conference on Advanced Intelligent Mechatronics (AIM).
Rout et al., "Advances in weld seam tracking techniques for robotic welding: A review", Robotics and Computer Integrated Manufacturing 56 (2018) 12-37.
Zych, "Programming of Wlding Robots in Shipbuilding", Procedia CIRP 99 (2021) 478-483.

* cited by examiner

AUTONOMOUS ASSEMBLY ROBOTS

CROSS-REFERENCE TO RELATED APPLICATIONS

This application claims the benefit of U.S. Provisional Patent Application No. 63/332,416, entitled, "AUTONOMOUS ASSEMBLY ROBOTS," filed on Apr. 19, 2022, which is expressly incorporated by reference herein in its entirety.

TECHNICAL FIELD

Aspects of the present disclosure relate generally to robotic systems, and more particularly, to robotic fabrication, assembly, or manufacturing systems, such as a robotic system for welding.

INTRODUCTION

Conventional fabrication and manufacturing may include a variety of tasks or processes, such as material handling, machining, and assembly, as illustrative, non-limiting examples. As compared to other tasks or processes, such as machining or material handling, an assembly task or process is generally considered to be more complex. The assembly task or process typically includes an act or process of bringing two or more objects (e.g., parts, pieces, components, etc.) together to be in a coupled relationship. To illustrate, the assembly task or process may include coupling or connecting two objects together to form a new component or a finished product. As illustrative, non-limiting example, coupling or connecting welding or riveting the two objects together may include or correspond to welding or riveting the two objects together.

A conventional assembly task or process may include a robot performing one or more assembly tasks. For example, a single robot may be configured to repetitively perform a task, such as an insertion task. To enable the single robot to repetitively perform the task, a rigid fixture, such as a weldment frame or an integrated motion axis, may be utilized to account for positional uncertainties. For complex assemblies, teach pendant or on-pendant assembly parameter optimization may also be used for control and operation of the single robot.

However, conventional single-manipulator robotic solutions, such as a rigid fixtures or a teach pendent or on-pendent device, for assembly tasks or processes may suffer from a variety of limitations. For example, the conventional single-manipulator robotic solutions may be limited with respect to the types of assemblies they can handle or a number of assemblies that can be completed. As another example, when a single-manipulator robotic solution includes the rigid fixture, the rigid fixture may increase set-up, installation, maintenance, and operation costs, and may be customized to a specific assembly task making a system inherently inflexible or adaptable to another assembly task. Additionally, or alternatively, when a single-manipulator robotic solution relies on or is used in conjunction with the teach pendent or on-pendent device, a modification to the assembly task or process, or operation of the corresponding robot, may need human (e.g., a programmer or machine operator) intervention to provide an input to the teach pendent or on-pendent device, thereby requiring the presence of a person and increasing operational costs or increasing lost productivity or production down-time if the person is not available.

BRIEF SUMMARY OF SOME EXAMPLES

The following summarizes some aspects of the present disclosure to provide a basic understanding of the discussed technology. This summary is not an extensive overview of all contemplated features of the disclosure and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

The present disclosure is related to apparatuses, systems, and methods that provide for robotic fabrication, assembly, or manufacturing. In some implementations, a robotic system, such as an assembly robotic system, is configured to couple multiple objects or components together to form an assembled component, subcomponent, or product. As illustrative, non-limiting examples, the multiple objects may be coupled via welding, brazing, soldering, or by implementing other manufacturing tasks on the multiple objects, such as riveting.

In some implementations, the robotic system is configured to locate one or more objects. For at least one object of the one or more object, the robotic system may determine a pose of the at least one object, identify a grip location on the at least one object, and pick up (e.g., lift, move, etc.) the at least one object at the grip location. As used herein, the term "pose" includes both position information (e.g., x, y, z coordinates) and orientation information (e.g., relative angle between the object and the ground or a holder on which the object is positioned). As another example, for each object of the one or more objects, the robotic system may determine a pose of the object, identify a grip location on the object, and pick up the object at the grip location.

In some implementations, a robotic system configured to perform one or more manufacturing operations may include multiple robots, such as two or more robots. The multiple robots may be configured, individually or in coordination with other robots, to autonomously perform one or more operations. The one or more operations may include picking-up an object, bringing together the picked-up object to another object (e.g., putting together, mating, or bring multiple objects close to each other), performing a manufacturing task (e.g., welding) on the objects, or a combination thereof. Additionally, or alternatively, the operations may include identifying the objects on which a manufacturing task (e.g., welding) may be performed, picking one or more of the objects, positioning the objects relative to each other, and performing the manufacturing task (e.g., welding). In some implementations, operations performed by one or more robots may be performed in conjunction with or based on a controller of the robotic system.

In one aspect of the disclosure, an assembly robotic system includes a first robot device positioned in a workspace, and a first tool coupled to the first robot device. The first tool configured to be selectively coupled to a first object. The assembly robotic system further includes one or more sensors that are each sensor configured to generate sensor data associated with the workspace. The assembly robotic system also includes a welding tool configured to couple two or more objects together. For example, the welding tool may be configured to fuse, join, or weld two or more objects together. To further illustrate, in some implementations, the welding tool may weld two objects together by laying a weld metal and fusing/coupling the two or more objects together. The assembly robotic system includes a controller configured to control the first tool to be coupled to the first object based on the sensor data, control the first robot device to bring the first object into a spatial relationship with a second object such that a seam is formed between the first object and the second object, and generate a weld instruction to cause the weld tool to weld the seam to couple the first object and the second object together. For example, the weld tool may lay a weld metal along the seam to couple the first object and the second object together.

In an additional aspect of the disclosure, an assembly robotic system includes a first robot device positioned in a workspace, and a first tool coupled to the first robot device. The first tool is configured to be selectively coupled to a first object. The assembly robotic system includes a second robot device positioned in the workspace, a second tool coupled to the second robot device. The second tool is configured to be selectively coupled to a second object. The first object and the second object configured to form a first seam between the first object and the second object. The assembly robotic system also includes a third robot device positioned in the workspace, and one or more sensors configured to generate sensor data associated with the workspace. At least a first sensor of the one or more sensors coupled to the third robot device. The assembly robotic system further includes a fourth robot device positioned in the workspace, and a welding tool coupled to the fourth robot device. The welding tool is configured to weld the first seam formed between the first object and the second object. For example, the weld tool may be configured to lay a weld metal along the first seam formed between the first object and the second object. As another example, the weld tool may be configured to fuse (e.g., heat fuse) the first seam formed between the first object and the second object. The assembly robotic system includes a controller configured to control, based on the sensor data, the first tool to be coupled to the first object at a first location on the first object, and control, based on the sensor data, the second tool to be coupled to the second object at a second location on the second object. The controller is further configured to control the first robot device, the second robot device, or both, to bring the first object and the second object into a first spatial relationship such that the first seam is formed between the first object and the second object, and generate a weld instruction to cause the weld tool to weld the first seam to couple the first object and the second object together. For example, the weld too may lay a weld metal along the first seam to couple the first object and the second object together.

In an additional aspect of the disclosure, a method of operating an assembly robotic system including a first tool coupled to a first robot device, a second tool coupled to a second robot device, one or more sensors, a weld tool, and a controller is disclosed. The method includes receiving, by a controller of an assembly robotic system, first sensor data from the one or more sensors. The method also includes controlling, by the controller and based on the first sensor data, the first tool to be coupled to a first object at a first location on the first object. The method further includes controlling, by the controller and based on the first sensor data, the second tool to be coupled to a second object at a second location on the second object. The method includes controlling, by the controller, the first robot device, the second robot device, or both, to bring the first object and the second object into a spatial relationship such that a seam is formed between the first object and the second object. The method also includes generating, by the controller, a weld instruction, and welding, by the weld tool responsive to the weld instruction, the seam to couple the first object and the second object together.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

A further understanding of the nature and advantages of the present disclosure may be realized by reference to the following drawings. In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Like reference numbers and designations in the various drawings indicate like elements.

DETAILED DESCRIPTION

Figure 1:
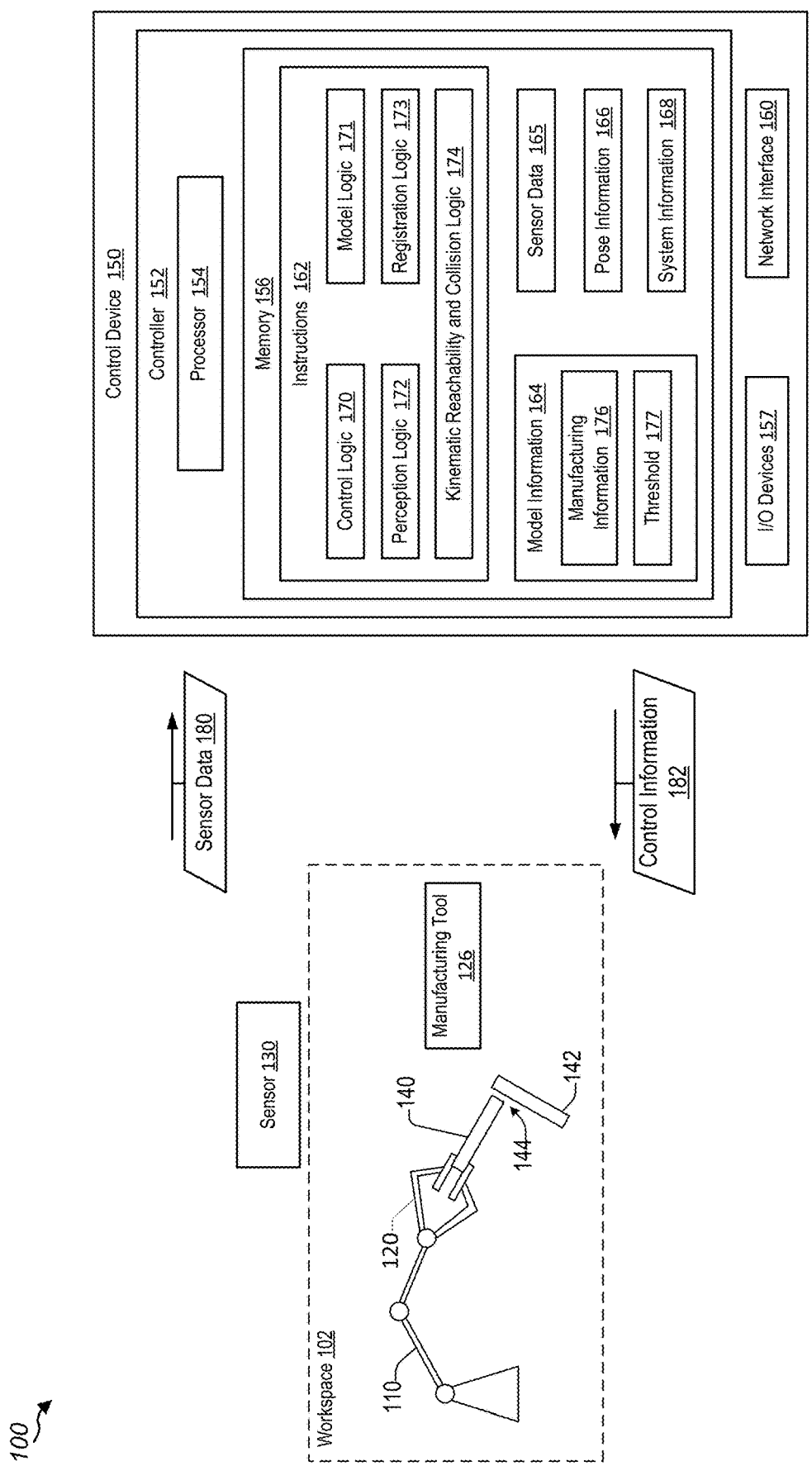
FIG. 1 is a block diagram illustrating details of an example of a robot system according to one or more aspects.

The detailed description set forth below, in connection with the appended drawings, is intended as a description of various configurations and is not intended to limit the scope of the disclosure. Rather, the detailed description includes specific details for the purpose of providing a thorough understanding of the inventive subject matter. It will be apparent to those skilled in the art that these specific details are not required in every case and that, in some instances, well-known structures and components are shown in block diagram form for clarity of presentation.

The present disclosure is related to apparatuses, systems, and methods that provide for robotic fabrication, assembly, or manufacturing. In some implementations, a robotic system, such as an assembly robotic system, is configured to perform an assembly task, such as coupling multiple objects or components together in a coupled state to form an assembled component, subcomponent, or product. The assembly task may involve performance of multiple processes to complete the assembly task. For example, assembly task may include completion of: locating one or more target objects, determining a pose of the one or more target objects, picking a set of objects of the one or more target objects, determining a pose of the set of objects relative to a robot device after picking, positioning the set of objects at the desired relative pose, and coordinating movements of one or more robot devices, performing an assembly or manufacturing task or operation (e.g., welding), or a combination thereof.

Performing one or more processes of the multiple processes associated with the assembly task may be computationally and algorithmically challenging. For example, performing the one or more processes may use a large amount of computational power, computationally and algorithmically intractable in view of the limitations of the classical computers, or a combination thereof. Such computational and algorithmic challenges may be multiplied for a system, such as an assembly robotic system, that includes a robot device has multiple degrees of freedom (DOF), such as six DOF. Given the computationally heavy nature, variability or variety of objects (e.g., objects can exist in any shape), variability or variety of manufacturing tasks (e.g., welding, riveting, painting, packaging), or a combination thereof, the assembly task has historically been a manual undertaking.

Use of one or more robots may enable an agile assembly solution that can readily accommodate changes in manufacturing processes. In some implementations, multiple robots may be used in the assembly process. At least one of the one or more robots may be used in the assembly process as a dynamic fixture to allows a part or object to be repositioned and manipulated to complete more complex assembly procedures. Use of one or more robots in the assembly process presents a variety of challenges to enable the assembly algorithms, such as programming difficulty or complexity, integration and coordination, advanced sensing and control capabilities, the like, or a combination thereof.

The present disclosure is related to apparatuses, systems, and methods that provide for robotic fabrication, assembly, or manufacturing. In some implementations, a robotic system, such as an assembly robotic system, is configured to couple multiple objects or components together to form an assembled component, subcomponent, or product. For example, the system may be configured to locate and identify one or more parts or objects to be welded, determine a pose of at least one of the one or more parts or objects, position the at least one part or object in space, and perform a manufacturing operation or task (e.g., weld) on the at least one part or object. In some implementations, the robotic system includes multiple robots and is configured to perform one or more robotic manufacturing operations, such as welding, brazing, soldering, riveting, etc., as illustrative, non-limiting examples. Additionally, or alternatively, one or more aspects of the robotic system described herein are related to sensing capabilities, control capabilities, or a combination thereof, to enable an agile assembly solution.

In some implementations of a system of the present disclosure, the system (e.g., an assembly robotic system) includes a tool coupled to a first robot device and configured to be selectively coupled to a first object. In some implementations, the tool includes a gripper or a clamp, as illustrative, non-limiting examples. Additionally, or alternatively, the first robot device may include a robotic arm configured to have six DOF. The system may also include a manufacturing tool (e.g., welding tool), one or more sensors configured to generate sensor data, and a controller. The controller may be configured to control the tool to couple the tool to the first object based on the sensor data, control the first robot device to bring the first object into a spatial relationship with a second object, and generate a manufacturing instruction to cause an operation to be performed by the manufacturing tool. For example, the manufacturing instruction may include a weld instructions to cause the manufacturing tool (e.g., a weld tool) to weld a seam formed between the first and second objects, such as along a seam formed by the first and second objects. To illustrate, the weld instructions may cause the manufacturing tool to lay a weld metal along the seam formed between the first and second objects.

In some implementations, the system may include one or more additional robot devices, such as a second robot device coupled to a second tool (e.g., a gripper), a third robot device coupled to at least one sensor of the one or more sensors, a fourth robot device coupled to the manufacturing tool, or a combination thereof. The controller may be configured to control the one or more additional robot devices to couple multiple objects or components together to form an assembled component, subcomponent, or product. To illustrate, the controller may receive model information, such as point cloud data associated with the first object, the second object, or the first object and the second object coupled together (e.g., in a coupled state). In some implementations, the model information may include a computer aided design (CAD) model of a representation of a structure including the first object and the second object, object identifier or parameter information of the first object or the second object, or a combination thereof.

The controller may also receive first sensor data from the one or more sensors. In some implementations, the controller is configured to control the third robot device to cause the at least one sensor to generate at least a portion of the first sensor data. The first sensor data may include image data, sonar data, ultrasound data, or the like, as illustrative, non-limiting examples. Based on the first sensor data, the controller may identify the first object, the second object, or a combination thereof. For example, to identify the first object, the controller may determine an object ID (e.g., a serial number, barcode, QR code, etc.) of the first object based on the first sensor data, match point could information associated with the first sensor data to point cloud information included in the model information, or a combination thereof.

After identification of the first object or the second object, the controller may perform a registration process to determine a pose of the first object or the second object. For example, with reference to the first object, the controller may perform the registration process to determine a first pose of the first object. To perform the registration process, the controller may perform a comparison or match operation based on the model information (e.g., point cloud data) and at least a portion of the first sensor data associated with the first object. Based on the first pose of the first object, the controller may determine a first location on the first object for the first tool to be coupled to (e.g., grasp and/or pick up) the first object, and control the first robot device and the first tool such that the first tool becomes coupled with the first object based on the first location. In some implementations, the controller may identify one or more locations on the first object for the first tool to be coupled to the first object and perform, for each of the one or more locations, a reachability analysis, a collision analysis, or a combination thereof. After the first tool is coupled to the first object, the controller may receive, from the one or more sensors, second sensor data associated with the first object coupled to the first tool. In some implementations, the controller may control the third robot device, the at least one sensor, or a combination thereof, to cause the at least one sensor to generate at least a portion of the second sensor data. The controller may perform the registration process, based on the model information and the second sensor data, to determine a second pose of the first object. A determination of the second pose of the first object may enable the system to correct for an actual coupling, between the first tool and the first object, that is different from the first location. In some implementations, the controller may perform a reachability analysis, a collision analysis, or a combination thereof, based on the second pose of the first object. Although, one or more operations have been described with reference to the first object, the controller may also perform the one or more operations with respect to the second object.

After the first tool is coupled to the first object and the second tool is coupled to the second object, the controller may control the first robot device, the first tool, the second robot device, the second tool, or a combination thereof, to bring the first object and the second object toward being in a spatial relationship such that a seam is formed between the first object and the second object. After the first object and the second object are brought together (toward being in the spatial relationship), the controller may confirm that the first object and the second object are in the spatial relationship— e.g., confirm whether or not a separation between the first object and the second object is less than or equal to a threshold, such as a threshold indicated by or included in the model information. Confirming that the first object and the second object are in the spatial relationship, may enable the system to ensure that the first object and the second object are in the spatial relationship before performing a manufacturing operation or assembly operation, such as a weld operation, on the first object and the second object.

To confirm that the first object and the second object are in the spatial relationship, the controller may receive third sensor data associated with the first object and the second object. In some implementations, the controller may control the third robot device, the at least one sensor, or a combination thereof, to cause the at least one sensor to generate at least a portion of the third sensor data. The controller may determine, based on the model information and the third sensor data, whether a separation between the first object and the second object is less than or equal to a threshold. As a non-illustrative example, the threshold indicate that the first object and the second object touch each other, or are close to each other, such as within a 1 mm distance. If the separation is greater than the threshold, the controller may perform the registration process on the first object or the second object, control the first robot device, the first tool, the second robot device, the second tool, or a combination thereof, to bring the first object and the second object toward being in the spatial relationship, or a combination thereof. The controller may determine whether or not the first object and the second object are in the spatial relationship after the registration process or controlling the first robot device, the first tool, the second robot device, the second tool, or a combination thereof. If the separation is greater than the threshold, the controller may generate a manufacturing instruction.

The controller may send or execute the manufacturing instruction. Execution of the manufacturing instruction may cause an operation to be performed by the manufacturing tool. For example, the manufacturing instruction may include a weld instructions to cause the manufacturing tool (e.g., a weld tool) to weld a seam formed between the first and second objects, such as along a seam formed by the first and second objects. To illustrate, the weld instructions may cause the manufacturing tool to lay a weld metal along the seam formed between the first and second objects. Accordingly, the system may include one or more robot devices configured to autonomously pick a first object, a second object, or both, bring the first object together with the second object, and perform a manufacturing task (e.g., weld) on the first and second objects.

Particular implementations of the subject matter described in this disclosure may be implemented to realize one or more of the following potential advantages or benefits. In some aspects, the present disclosure provides techniques for performing an assembly task. Additionally, the techniques described herein may provide improved sensing and control capabilities as compared to conventional systems. The techniques for performing the assembly task may enable the system to couple confirm or update a pose of one or more objects during performance of the assembly task to maintain coordination and accuracy within the system. Additionally, or alternatively, the techniques may provide or enable an agile assembly solution that can readily accommodate changes in manufacturing processes, such as complex assembly of different components or products by the same system.

Referring to FIG. 1, a diagram illustrating details of an example of a robot system 100 according to one or more aspects. In some implementations, the robot system 100 may include or correspond to an assembly robot system. The robot system 100 may be configured to couple a first object 140 and a second object 142. For example, the first object 140 and the second object 142 may be designed to form a seam between the first object 140 and the second object 142. Each of the first object 140 and the second object 142 may be any part, component, subcomponent, combination of parts or components, or the like and without limitation.

In some implementations, robot system 100 may include or may be associated with a workspace 102, such as a two-dimensional area or a three-dimensional space. The workspace 102 may also be referred to as a manufacturing workspace. In some implementations, the workspace 102 can be any suitable welding area or space designed with appropriate safety measures for welding. For example, workspace 102 can be a welding area or space located in a workshop, job shop, manufacturing plant, fabrication shop, outdoor construction area, or the like. In some implementations, at least a portion of the robot system 100 is positioned in the workspace 102. For example, the workspace 102 may be an area or space within which one or more robot devices (e.g., a robot arm(s)) is configured to operate on one or more objects (or parts). The one or more objects may be positioned on, coupled to, stored at, or otherwise supported by one or more platforms, containers, bins, racks, holders, or positioners. The one or more robot devices may be configured to operate on the one or more objects based on information received from one or more sensors as described further herein.

The robot system 100 includes a first robot device 110, a first tool 120, a manufacturing tool 126, one or more sensors 130 (referred to herein after as the "sensor 130"), and a control device 150. The control device 150 is coupled to the first robot device 110, the first tool 120, the manufacturing tool 126, the sensor 130, or a combination thereof. For example, the control device 150 may be communicatively coupled, via a wired connection, a wireless connection, or a combination thereof, to the first robot device 110, the first tool 120, the manufacturing tool 126, the sensor 130, or a combination thereof.

The first robot device 110 includes a mechanical device, such as a robotic arm. In some implementations, the first robot device 110 may be configured to have six DOF or fewer than six DOF. The first robot device 110 may include one or more components, such as a motor, a servo, hydraulics, or a combination thereof, as illustrative, non-limiting examples. In some implementations, the first robot device 110 includes a robotic arm, such as a robotic arm manufactured by YASKAWA®, ABB® IRB, KUKA®, or Universal Robots®.

In some implementations, the first robot device 110 may be coupled to or include one or more tools. For example, based on the functionality the robot performs, the robot arm can be coupled to a tool configured to enable (e.g., perform at least a part of) the functionality. To illustrate, a tool, such as the first tool 120, may be coupled to an end of the first robot device 110. In some implementations, the first robot device 110 may be coupled to or include multiple tools, such as a manufacturing tool (e.g., a welding tool), a sensor, a picker or holder tool, or a combination thereof. In some implementations, the first robot device 110 may be configured to operate with another device, such as another robot device, as described further herein.

The first tool 120 may include one or more tools. For example, first tool 120 may include a manufacturing tool (e.g., a welding tool), a sensor (e.g., 130), a picker tool or a holder tool, or a combination thereof. As shown, the first tool 120 is the picker tool or the holder tool that is configured to be selectively coupled to a first set of one or more objects, such as a first set of one or more objects that include the first object 140. In some implementations, the picker tool or the holder tool may include or correspond to a gripper, a clamp, a magnet, or a vacuum, as illustrative, non-limiting examples. For example, the first tool 120 may include a three-finger gripper, such as one manufactured by OnRobot®.

In some implementations, the robot device 110, the first tool 120, or a combination thereof, may be configured to change (e.g., adjust or manipulate) a pose of the first object 140 while the first object 140 is coupled to the first tool 120. For example a configuration of the robot device 110 may be modified to change the pose of the first object 140. Additionally, or alternatively, the first tool 120 may be adjusted (e.g., rotated or tilted) with respect to the robot device 110 to change the pose of the first object 140.

The manufacturing tool 126 is configured to perform one or more manufacturing tasks or operations. The one or more manufacturing tasks or operations may include welding, brazing, soldering, riveting, cutting, drilling, or the like, as illustrative, non-limiting examples. In some implementations, the manufacturing tool 126 is a welding tool configured to couple two or more objects together. For example, the weld tool may be configured to weld two or more objects together, such as welding the first object 140 to the second object 142. To illustrate, the weld tool may be configured to lay a weld metal along a seam formed between the first object 140 and the second object 142. Additionally, or alternatively, the weld tool may be configured to fuse the first object 140 and the second object 142 together, such as fusing the seam formed between the first object 140 and the second object 142 to couple the first object 140 and the second object 142 together. In some implementations, the manufacturing tool 126 may be configured to perform the one or more manufacturing tasks or operations responsive to a manufacturing instruction, such as a weld instruction.

The sensor 130 is configured to generate sensor data, such as sensor data 180. The sensor 130 may be positioned on or coupled to a robot device (e.g., a robotic arm), a structure or frame, or the like, as illustrative, non-limiting examples. Additionally, or alternatively, the sensor 130 may be stationary or dynamic (e.g., movable). In some implementations, the sensor 130 may be coupled to a movable device or may be configured to rotate, move along a rail or cable, or a combination thereof, as illustrative, non-limiting examples.

The sensor 130 may be configured to generate the sensor data 180 that is associated with the robot system 100, the workspace 102, or a combination thereof. The sensor 130 may include a visual sensor, Light Detection and Ranging (LiDAR) sensor, an audio sensor, a, electromagnetic sensor, an ultrasound sensor, or a combination thereof, as illustrative, non-limiting examples. For example, the sensor 130 may include a camera (e.g., a camera with a built in laser) or a scanner (e.g., a laser scanner) that is configured to capture visual information (e.g., two-dimensional (2D) images or three-dimensional (3D) scanning). In some implementations, the sensor 130 may be 3D sensor, such as a scanner sold by Photoneo®. As another example, the sensor 130 may be an audio sensor, such as a Sound Navigation and Ranging (SONAR) device, configured to emit or capture sound. Additionally, or alternatively, the sensor 130 may be an electromagnetic sensor, such as a Radio Detection and Ranging (RADAR) device, configured to emit and/or capture electromagnetic (EM) waves. Through visual, audio, electromagnetic, and/or other sensing technologies, the sensor 130 may collect information about physical structures and objects associated with or in the workspace 102. Accordingly, the first sensor data 180 may include image data, sonar data, ultrasound data, or the like, as illustrative, non-limiting examples.

The sensor 130 may be configured to collect static information associated with a stationary structure or object, dynamic information associated with a moving structure or object, or a combination thereof. The sensor 130 may generate the sensor data 180 (e.g., 2D image data, 3D image data, audio data, electromagnetic data, or other data) that is provided to another device, such as to the controller device 150, to generate a 3D representation of the physical structures or objects. As described above, the sensor 130 can capture multiple 2D images from various angles (e.g., multiple fields of view).

In some implementations, the sensor 130 may be a 3D sensor configured to use structured light projection to reconstruct the geometry of a 3D surface of an inspected object (e.g., the first object 140 or the second object 142). For example, one or more structured patterns may be projected onto a scene or object during a scan, which may allow calculation of depth from one or more images of the scene. Information regarding the surface geometry of the scanned object or scene may be included in the sensor data 180 as a depth map or in the form of a point cloud, as illustrative, non-limiting examples.

The control device 150 includes a controller 152, one or more I/O devices 157, and a network interface 160. The controller 152 may be any suitable machine that is specifically and specially configured (e.g., programmed) to perform one or more operations as described herein. In some implementations, the controller 152 is not a general-purpose computer and is specially programmed or hardware-configured to perform the one or more operations as described herein. Additionally, or alternatively, the controller 308 is or includes an application-specific integrated circuit (ASIC), a central processing unit (CPU), a field programmable gate array (FPGA), or a combination thereof.

In some implementations, the controller 152 includes a processor 154 and a memory 156. The processor 154 may comprise various forms of processor-based systems in accordance with aspects described herein. For example, the processor 154 may include a general purpose computer system (e.g., a personal computer (PC), a server, a tablet device, etc.) and/or a special purpose processor platform (e.g., application specific integrated circuit (ASIC), system on a chip (SoC), etc.).

The processor 154 may include one or more processors. The processor 154 may be configured to process sensor data 180, perform object detection and/or recognition, perform coordination or control functions, or a combination thereof, as illustrative, non-limiting examples. Additionally, or alternatively, the processor 154 may be configured to generate control information, such as control information 182 for another device, such as the first robot device 110, the first tool 120, the manufacturing tool 126, or the sensor 130. For example, the processor 154 may be configured to perform one or more operations as described herein.

The memory 156 may include ROM devices, RAM devices, one or more HDDs, flash memory devices, SSDs, other devices configured to store data in a persistent or non-persistent state, or a combination of different memory devices. The memory 156 includes or is configured to store instructions 162, model information 164, sensor data 165, pose information 166, and system information 168. In one or more aspects, the memory 156 may store the instructions 162, such as executable code, that, when executed by the processor 154, cause the processor 154 to perform operations according to one or more aspects of the present disclosure, as described herein. In some implementations, the instructions 162 (e.g., the executable code) is a single, self-contained, program. In other implementations, the instructions 162 (e.g., the executable code) is a program having one or more function calls to other executable code which may be stored in storage or elsewhere. The one or more functions attributed to execution of the executable code may be implemented by hardware. For example, multiple processors may be used to perform one or more discrete tasks of the executable code.

The instructions 162 include control logic 170, model logic 171, perception logic 172, registration logic 173, and kinematic reachability and collision logic 174. The control logic 170 is configured to control operation or send commands or requests to one or more devices or components, such as the first robot device 110, the first tool 120, the manufacturing tool 126, or the sensor, of the robot system 100. In some implementations, the control logic 170 may include weld control logic. The weld control logic may be configured to control a welding process performed via a welding tool. Although described as being included in controller 152, in other implementations, the weld control logic may be included in a different device that is configured to communicate with the controller 152.

The model logic 171 may be configured to perform one or more operations associated with model information 164. For example, the model logic 171 may be configured to parse or process a CAD file to identify one or more objects, one or more subcomponents, a final assembly, annotation information, a point cloud model of an object or final assembly, welding instructions, a welding plan, or a combination thereof.

The perception logic 172 may be configured to perform one or more operations associated with processing the sensor data 180, generating a 3D representation (e.g., a 2D representation and/or a 3D representation) based on the sensor data 180, locating and identifying an object, generating pose information, performing object joining processing, or a combination thereof, as illustrative, non-limiting examples. In some implementations, the perception logic 172 may be configured to perform one or more operations based on or in conjunction with the registration logic 173, the kinematic reachability and collision logic 174, or a combination thereof. Although one or more operations of the perception logic 172 are described herein with reference to a 3D representations, similar operations may be performed by the perception logic 172 with respect to 2D data and/or a 2D representation.

In some implementations, the perception logic 172 may use the sensor data 180 to generate a 3D representation associated with the workspace 102 or one or more objects associated with an assembly task. For example, the sensor data 180 may include one or more images (e.g., 2D image data captured by the sensor 130 at a particular orientation relative to the first object 140 or the second object 142). The perception logic 172 may overlap or stitch together multiple images to generate 3D image data associated with a 3D representation. In some implementations, if the 3D representation includes multiple objects, the perception logic 172 perform a clustering algorithm (e.g., K-means, affinity propagation, DBSCAN, mean shift, etc.) to segment or partition the 3D representation in different classes or clusters. Additionally, or alternatively, the clustering algorithm may locate and identify a target object, such as an object to be assembled, within the 3D representation.

In some implementations, to identify the target object, the perception logic 172 may utilize information (e.g., annotations or user input from a user, shape of the objects forming the final object, identity information of the objects forming the final assembled object present in the CAD file, etc.) present in the representation of the final assembled object to identify and locate the target objects within the 3D representation. For example, the perception logic 172 may perform a shape-identifying algorithm to determine the shape of one or more objects within the 3D representation. To illustrate, the perception logic 172 (or the model logic 171) may determine the shapes of the objects in the final assembled object present in the CAD file (e.g., either shape information in the file or by implementing a feature or shape recognition algorithms) and use the determined shape to identify the target objects in the 3D representation. In some implementations, the annotations from the user may include seam annotations, annotation corresponding to the locations at which tack welds are to be performed, and the like.

In some implementations, the perception logic 172 may not perform the clustering algorithm in situations where the target objects have identity information (e.g., unique ID information) associated therewith. This identity information may be present in the CAD model of the final assembled object. Additionally, or alternatively, the identity information may be loaded (or provided) to the controller 152 from the sensor 130. In such implementations, after generating the 3D representation and receiving the unique IDs associated with the objects forming the final assembled object, the perception logic 172 may identify the target objects within the 3D representation using the unique IDs or other information provided to the controller 152. After the target object is identified, the perception logic 172 may locate the target object, such as locating the target object within or in relation to the workspace 102 or a device of the robot system 100. For example, after identification of the target objects, the perception logic 172 may determine a location within the 3D representation, which may be translated to a real-life location of the target object.

In some implementations, the perception logic 172 may determine a pose of a target object. Determining the pose of the target object may assist in determining the location at which the tool 120 may pick or be coupled to the target object (e.g., the first object 140). It is noted that a location at which the first tool 120 may hold the first object 140 may be referred to as a pickup location. The location at which the first tool 120 may pick-up or hold the first object 140 may depend on the pose at of the target object (e.g., the first object 140). In some implementations, at least some information regarding the pose (e.g., position and orientation) of the target object may be determined based on a registration technique performed by the registration logic 173.

In some implementations, the perception logic 172 may be configured to perform or imitate an objects joining technique to bring two objects, such as the first object 140 and the second object 142, into a spatial relationship (e.g., to a fixed relative pose). The objects joining technique may determine how to orient the objects in space relative to each other and manage the mobility and reachability constraints related to one or more robot devices, one or more tools, or a combination thereof, to position the objects in a fixed pose and perform a manufacturing task. The objects joining technique may include defining a hypothetical space, such as a bounding box, the workspace 102 in which the objects may be assembled. This hypothetical space may be a cube (or other shape), of a certain length, width, and height. The perception logic 172 may perform the objects joining technique based on or in conjunction with a kinematic reachability analysis and collision analysis perform by the kinematic reachability analysis and collision logic 174. For example, the controller 308 may perform a reachability analysis and collision analysis on one or more robot devices or objects that may need to enter the hypothetical space to determine whether the one or more robot device or the objects can exist in one or more states in the hypothetical space (alone or together with the other object). The perception logic 172 or the kinematic reachability analysis and collision logic 174 may consider a pose of one of the objects as a reference pose and then perform the reachability analysis and collision analysis on the other object with respect to the reference pose of the one object. Additionally, or alternatively, the reachability analysis and collision analysis may be performed based on the CAD model of the assembled objects.

The registration logic 173 is configured to perform a registration process. The registration process is configured to transform or aligns data from different sources, such as a CAD model point cloud and a 3D representation, with the same coordinate frame or system. To illustrate, the registration logic 173 may perform the registration process using the point cloud of a CAD model of the first object 140 and a 3D representation of the first object 140 (generated using the sensor data 180) by sampling the CAD model point cloud and the 3D representation. The sampling may be performed such that the points in the CAD model point cloud and the 3D representation have a uniform or approximately uniform dispersion or equal or approximately equal point density. Based on the sampling, the coordinate systems of the model and the 3D representation may be coarsely (e.g., with resolution of 1 cm) and finely (e.g., with a resolution of 1 mm) aligned.

The kinematic reachability and collision logic 174 is configured to perform a kinematic reachability analysis and a collision analysis. In evaluating kinematic reachability and collision, the kinematic reachability and collision logic 174 may perform multiple different computations. In some examples, these computations may be mutually exclusive from one another. In some examples, kinematic feasibility computation computes whether the arm of the picking robot can mechanically reach (or exist) needed to pick the target object from the pickup location. In some examples, in addition to the kinematic feasibility computation, collision computation may be performed. The kinematic reachability and collision logic 174 may use a flexible collision library (FCL) in performing the collision computation. The FCL includes various techniques for efficient collision detection and proximity computations, as a tool in the collision avoidance analysis or computation. The FCL is useful to perform multiple proximity queries on different model representations, and it may be used to perform probabilistic collision identification between 3D representations. Additional or alternative resources may be used in conjunction with or in lieu of the FCL.

Aspects of the kinematic feasibility analysis for a particular type of a robotic arm are described as an example to provide a basic understanding of the discussed technology. This example of aspects the kinematic feasibility analysis is not an extensive overview of all contemplated features of all different kinds and types of robotic arms. The example of the robotic arm with 6 degrees of freedom and 6 joints is not intended to delineate the scope of any or all aspects of the disclosure. In other examples of robotic arms, the degrees of freedom and the number of joints may be different from each other (e.g., the number of joints may be 5 and the degrees of freedom may be 6).

As an example, in evaluating feasibility of welding at each of multiple nodes or node-waypoint pairs, the kinematic reachability and collision logic 174 may perform multiple computations. In some implementations, each of the multiple computations may be mutually exclusive from one another. In some implementations, the first computation may include kinematic feasibility computation, which computes whether a robotic arm of coupled to a welding tool being employed can mechanically reach (or exist) at the state defined by the node or node-waypoint pair. In some implementations, in addition to the first computation, a second computation—which may be mutually exclusive to the first computation—may also be performed. The second computation may include computing whether the robotic arm will encounter a collision (e.g., collide with the workspace or something in the workspace) when accessing the portion of the seam (e.g., the node or node-waypoint pair in question).

The first computation may be performed before performing the second computation. In some implementations, the second computation may be performed only if the result of the first computation is positive (e.g., if it is determined that the robotic arm can mechanically reach (or exist) at the state defined by the node or node-waypoint pair). In some implementations, the second computation may not be performed if the result of the first computation is negative (e.g., if it is determined that the robotic arm cannot mechanically reach (or exist) at the state defined by the node or node-waypoint pair).

The kinematic feasibility may correlate with the type of robotic arm employed. For the purposes of this description, it is assumed that the robotic arm includes a six-axis robotic welding arm with a spherical wrist. The six-axis robotic arm can have 6 degrees of freedom—three degrees of freedom in X-, Y-, Z-cartesian coordinates and three additional degrees of freedom because of the wrist-like nature of the robotic arm. For example, the wrist-like nature of the robotic arm results in a fourth degree of freedom in wrist-up/-down manner (e.g., wrist moving in +y and −y direction), a fifth degree of freedom in wrist-side manner (e.g., wrist moving in −x and +x direction), and sixth degree of freedom in rotation. In some implementations, the welding tool is attached to the wrist portion of the robot arm.

Figure 14:
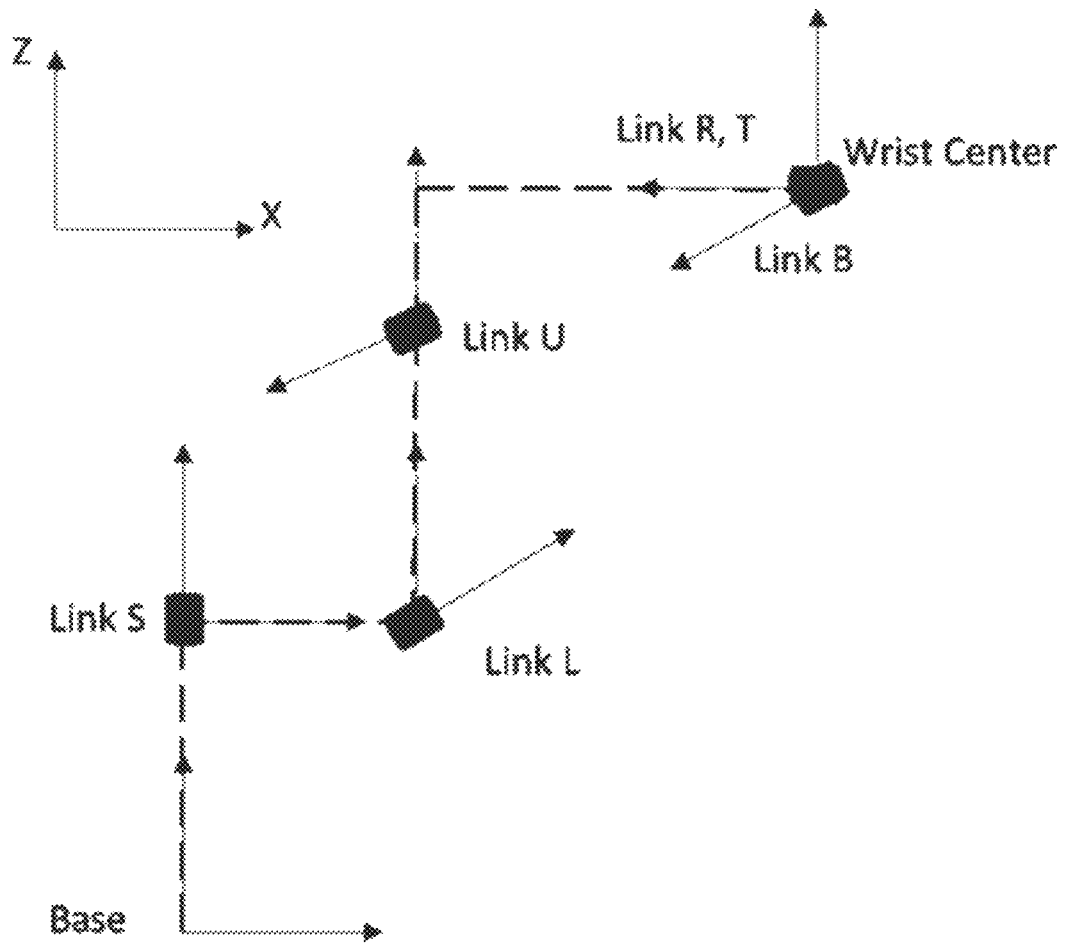
FIG. 14 is an example of a representation of a robotic arm according to one or more aspects.

Referring to FIG. 14, an example is illustrated of a representation of a robotic arm according to one or more aspects. The representation of the robotic arm includes a base, a wrist center, and links B, L, R, S, T, and U, which may be considered as joint variables. To determine whether the robotic arm being employed can mechanically reach (or exist) at the state defined by the node or node-waypoint pair—i.e., to perform the first computation—the robot arm (including the welding tool) may be mathematically modeled and for that the following mathematical modeling may be employed. In some implementations, the kinematic reachability and collision logic 174 may solve for the first three joint variables based on a wrist position and solve for the other three joint variables based on wrist orientation. It is noted that the torch of the welding tool may be attached rigidly on the wrist. Accordingly, the transformation between torch tip and wrist is assumed to be fixed. To find first three joint variables (e.g., variables S, L, U), geometric approach (e.g., law of cosine) may be employed.

Once the first three joint variables (S, L, U) are computed successfully, the kinematic reachability and collision logic 174 may then solve for last three joint variables (R, B, T) by, for example, considering wrist orientation as Z-Y-Z Euler angle. Note that the kinematic reachability and collision logic 174 may need to consider some offsets in the robot. These offsets may need to be considered and accounted for because of inconsistencies in a unified robot description format (URDF) file. For example, in some implementations, values (e.g., a joint's X axis) of the position a joint (e.g., actual joint of the welding robot) may not be consistent with the value noted in its URDF file. Such offset values may be provided to the controller in a table. The kinematic reachability and collision logic 174, in some implementations, may take into account these offset values while mathematically modeling the robotic arm. In some implementations, once the robotic arm is mathematically modeled, the kinematic reachability and collision logic 174 may determine whether the robotic arm can mechanically reach (or exist) at the states defined by the node or node-waypoint pair.

As noted above, the kinematic reachability and collision logic 174 can evaluate whether the robotic arm would collide or interfere with the part, the fixture, or anything else in the environment of the robotic arm if placed at the position and orientation defined by that waypoint-node pair. Once the kinematic reachability and collision logic 174 determines the states at which the robotic arm can exist in, the kinematic reachability and collision logic 174 may perform the foregoing evaluation (e.g., regarding whether the robotic arm would collide something in its environment) using the second computation.

The model information 164 may include manufacturing information 176 and threshold 177. The manufacturing information 176 may include a computer aided design (CAD) model of a representation of a structure (e.g., a final assembly) including the first object 140 and the second object 142. For example, the representation may include a point cloud of the final assembled object. The CAD model may indicate a spatial relationship of the first object 140 and the second object 142, include annotations associated with the first object 140, the second object 142, or a seam 144 formed between the first object 140 and the second object 142, or a combination thereof. Additionally, or alternatively, the manufacturing information 176 may include a point cloud of the objects generated using the CAD model (also herein referred to as CAD model point cloud), welding instructions or weld plans for the first object 140 and the second object 142, tool center point (TCP) information related to the tools, or a combination thereof. In this disclosure, the terms weld plan and welding instructions are used interchangeably. The manufacturing information 176 may also include identification information associated with one or more objects. The identification information may include RFID tag information, a marker (e.g., a barcode or QR code), a part number, geometric configuration (e.g., shape and dimensions) of the object, physical characteristics (e.g., weight) of the object, other related information, or a combination thereof.

Threshold 177 may include or correspond to one or more design constraints associated with the final product. The one or more design constraints may include one or more maximum values, one or more minimum values, one or more ranges, or a combination thereof.

The sensor data 165 may include or correspond to the sensor data 180 received by the control device. The pose information 166 may include or correspond to a pose of the first object 140, the second object 142, or a combination thereof. The system information 168 may include information associated with one or more devices (e.g., the robot device 110, the tool 120, the manufacturing tool 126, or the sensor 130) of robot system 100. To illustrate, the system information 168 may include ID information, a communication address, one or more parameters, or a combination thereof, as illustrative, non-limiting examples.

The one or more I/O devices 157 may include a mouse, a keyboard, a display device, the camera, other I/O devices, or a combination thereof, as illustrative, non-limiting examples. The network interface 160 may be configured to communicatively couple the control device 150 to one or more other devices, such as the first robot device 110, the first tool 120, the manufacturing tool 126, the sensor 130, or a combination thereof. For example, control device 150 may be configured to receive sensor data 180 from the sensor 130, output control information 182 to one or more other devices, or a combination thereof. To illustrate, the control device may be configured to communicate via an Ethernet connection or a wireless communication protocols such as Wi-Fi.

In some implementations, the control device 150 may be a single device configured to perform the operations described herein. Those of skill in the art would recognize that although FIG. 1 illustrates the control device 150 as a single block, the implementation of the control device 150 is not limited to a single component, and instead may be distributed over several components. For example, operations of the control device 150 may be distributed over multiple devices configured to perform all or a portion of the operations of the control device 150 in accordance with the present disclosure. Implementing the control device 150 functionality over multiple devices may increase efficiency, processing time, and reliability of the robot system 100.

During operation of the robot system 100, the controller 152 (e.g., the control device 150) may receive and store model information 164, such as point cloud data associated with the first object 140, the second object 142, or the first object 140 and the second object 142 coupled together (e.g., in a coupled state). In some implementations, the model information 164 may include a CAD model of a representation of a structure including the first object 140 and the second object 142, object identifier or parameter information of the first object 140 or the second object 142, or a combination thereof.

The controller 152 may also receive sensor data 180 from the sensor 130. In some implementations, the controller 152 is configured to control the sensor 130 to generate at least a portion of the sensor data 180. Based on the sensor data 180, the controller 152 may identify the first object 140, the second object 142, or a combination thereof. For example, to identify the first object 140, the controller 152 may determine an object ID (e.g., a serial number, barcode, QR code, etc.) of the first object 140 based on the first sensor data 180, match a 3D representation associated with the sensor data 180 to point cloud information included in the model information 164, or a combination thereof.

After identification of the first object 140 or the second object 142, the controller 152 may perform a registration process to determine a pose of the first object 140 or the second object 142. For example, with reference to the first object 140, the controller 152 may perform (using the registration logic 173) the registration process to determine a first pose of the first object 140. To perform the registration process, the controller 152 may compare perform a comparison or match operation based on the model information (e.g., point cloud data) and at least a portion of the sensor data 180 associated with the first object 140.

Based on the first pose of the first object 140, the controller 152 may determine a first location on the first object 140 for the tool 120 to be coupled to (e.g., grasp and/or pick up) the first object 140, and control the robot device 110 and the first tool 120 such that the first tool 120 becomes coupled with the first object 140 based on the first location. In some implementations, the controller may identify one or more locations on the first object 140 for the first tool 120 to be coupled to the first object 140 and perform, for each of the one or more locations, a reachability analysis, a collision analysis, or a combination thereof.

The controller 152 may generate and send the control information to the robot device 110 or the tool 120 to enable or cause the tool 120 to be coupled to the first object 140. After the tool 120 is coupled to the first object 140, the controller 152 may receive additional sensor data (e.g., 180) from the sensor 130. The additional sensor data may be associated with the first object 140 coupled to the first tool 120. The controller 152 may perform the registration process, based on the model information 164 and the additional sensor data, to determine a second pose of the first object 140. In some implementations, the controller may perform a reachability analysis, a collision analysis, or a combination thereof, based on the second pose of the first object 140.

The controller 152 may control the robot device 110 to bring the first object 140 into a spatial relationship with the second object 142 such that a seam 144 is formed between the first object 140 and the second object 142. For example, the controller 152 may be configured to control the tool 120, the robot device 110, or a combination thereof to adjust the second pose of the first object 140. In some implementations, the controller 152 may change a configuration of the robot device 110 to bring together the first object 140 and the second object 142. The configuration of the robot device 110 may include a pose at which the first object 140 is held.

To confirm that the first object 140 and the second object 142 are in the spatial relationship, the controller 152 may receive sensor data (e.g., 180) associated with the first object 140 and the second object 142. The controller 152 may determine, based on the model information and the sensor data, whether a separation (e.g., a gap) between the first object and the second object is less than or equal to (or within) a threshold (e.g., 177). If the separation is greater than the threshold, the controller 152 may perform the registration process on the first object 140 or the second object 142, control the robot device 110 or the tool 120 to bring the first object 140 and the second object 142 toward being in the spatial relationship. The controller 152 may perform the registration process again after adjusting the first object 140 to be in the spatial relationship with the second object 142. If the separation is greater than the threshold, the controller 152 may generate a manufacturing instruction. Although the description above provides for using a registration process to confirm/detect the spatial relationship, in other implementations, the spatial relationship may be performed using visual or force servoing techniques, or a combination of the two.

The manufacturing instruction (e.g., 182) may cause an operation to be performed by the manufacturing tool 126. The controller 152 may send or execute the manufacturing instruction. Execution of the manufacturing instruction may cause an operation to be performed by the manufacturing tool 126. For example, the manufacturing instruction may include one or more weld instructions to cause the manufacturing tool 126 (e.g., a weld tool) to weld a seam formed between the first and second objects, such as weld along a seam formed by the first and second objects. To illustrate, the manufacturing tool 126 may lay a weld metal along the seam, may spot weld the seam, may fuse the seam, or a combination thereof.

In some implementations, after the weld metal is laid to couple the first object 140 and the second object 142 together, the controller 152 is further configured to control the tool 120 to be decoupled with the first object 140 and to be coupled to a third object at a third location on the third object. The controller 152 may also control the robot device 110 to bring the third object into a second spatial relationship with the first object 140 and the second object 142 which are coupled together such that a second seam is formed between the third object and the first object 140 or the second object 142. The controller 152 may generate a weld instruction to cause the manufacturing tool 126 weld the second seam to couple the third object, the first object 140, and the second object 142 together.

In some implementations, the robot system 100 may include one or more other components. For example, the robot system 100 may include a positioner, a structure (e.g., a frame), or a combination thereof. The positioner may be configured to hold (e.g., host) the first object 140, the second object 142, or a combination there of. For example, the positioner may host the first object 140 prior to the first object 140 being picked up by the tool 120. The structure may be configured to support the sensor 130. Additionally, or alternatively, the robot system 100 may include one or more additional robot devices.

In some implementations, the robot system 100 includes the robot device 110 positioned in the workspace 102, and the tool 120 coupled to the robot device 110. The tool 120 is configured to be selectively coupled to the first object 140. The robot system 100 further includes the sensor 130 that is configured to generate the sensor data 180 associated with the workspace 102. The robot system 100 also includes the manufacturing tool 126 (e.g., a welding tool) configured to couple two or more objects together. For example, the manufacturing tool 126 (e.g., the welding tool) may be configured to lay a weld metal to couple two or more objects together. The robot system 100 includes the controller 152 configured to control the tool 120 to be coupled to the first object 140 based on the sensor data 180, control the robot device 110 to bring the first object 140 into a spatial relationship with the second object 142 such that the seam 144 is formed between the first object 140 and the second object 142, and generate a weld instruction (e.g., 182) to cause the weld tool to lay the weld metal along weld the seam 144 to couple the first object 140 and the second object 142 together. For example, the weld instruction (e.g., 182) may cause the weld tool to lay a weld metal along weld the seam 144 to couple the first object 140 and the second object 142 together.

One advantage provided by the robot system 100 of FIG. 1 is that the robot system 100 provides techniques for performing an assembly task. For example, the robot system 100 provides a robot device configured to autonomously pick the first object 140, bring the first object together with the second object, and enable a manufacturing task (e.g., weld) to be performed on the first and second objects. Additionally, the robot system 100 includes improved sensing and control capabilities as compared to conventional systems such that the robot system 100 is able to confirm or update a pose of one or more objects during performance of the assembly task to maintain coordination and accuracy within the system.

Figure 2:
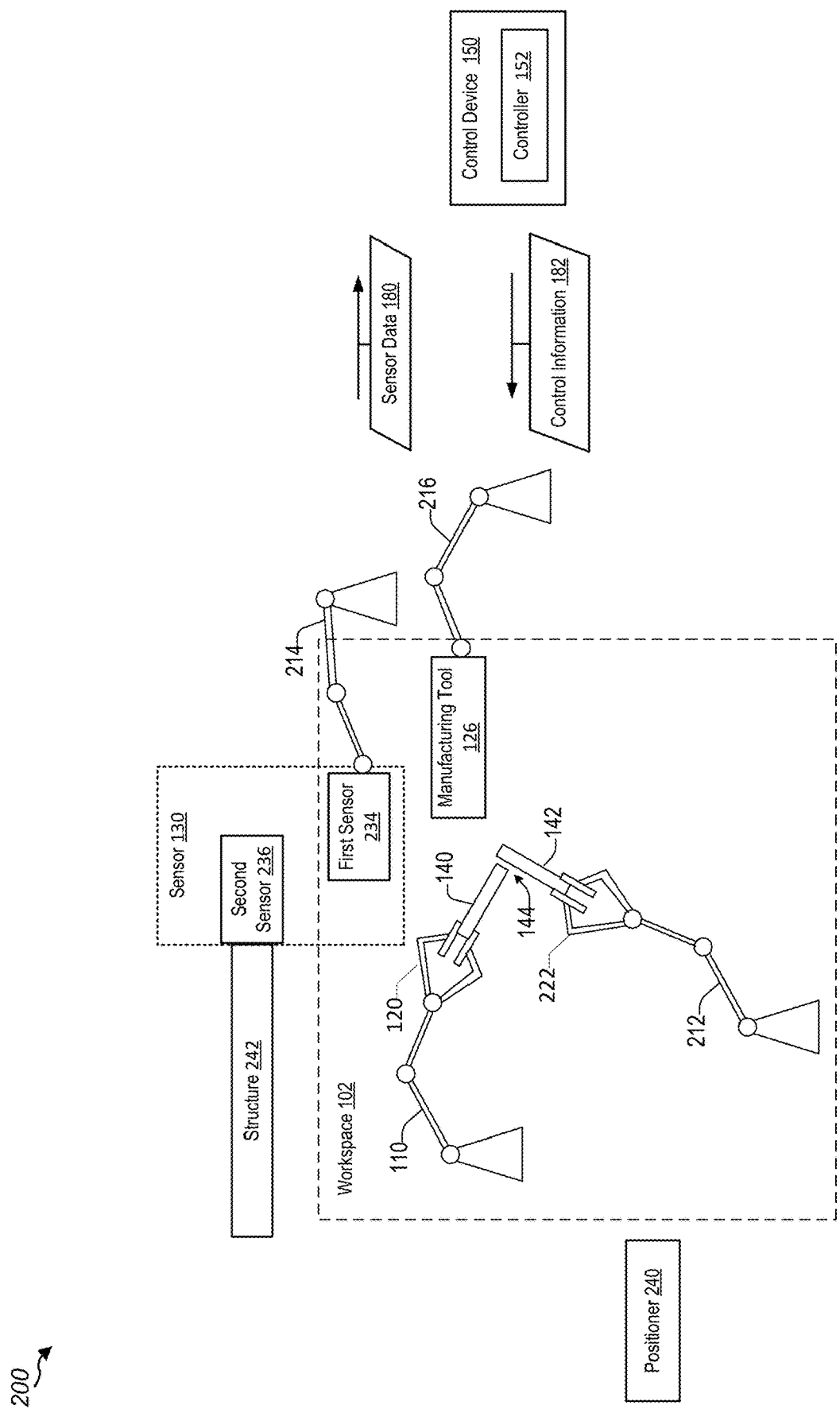
FIG. 2 is a block diagram illustrating details of another example of a robot system according to one or more aspects.

Referring to FIG. 2, FIG. 2 is a block diagram illustrating details of another example of a robot system 200 according to one or more aspects. The robot system 200 may include or correspond to the robot system 100 of FIG. 1.

As compared to the robot system 100 of FIG. 1, the robot system 200 includes multiple robot devices. To illustrate, the multiple robot devices include four robot devices including a first robot device (e.g., 110), a second robot device 212, a third robot device 214, and a fourth robot device 216. Additionally, the sensor 130 includes multiple sensors, such as a first sensor 234 and a second sensor 236. The robot system 200 also includes a positioner 240 (e.g., a positioner device), a structure 242, and a second tool 222 in addition to a first tool 120.

The workspace 102 of the robot system 200 may include one or more devices or components of the robot system 200. As shown, workspace 102 includes the first robot device 110, the first tool 120, the second robot device 212, the second tool 222, the first sensor 234, and the manufacturing tool 126. In other implementations, the workspace 102 may include fewer or more components or devices than shown in FIG. 2. For example, the workspace 102 may include the third robot device 214, the fourth robot device 216, the second sensor 236, the positioner 240, the structure 242, the control device 150, or a combination thereof.

In some implementations, the multiple robot devices may include or correspond to the robot device 110. For example, at least one of the multiple robot devices (e.g., 110, 212, 214, 216) may include a robotic arm providing—as a non-limiting example—six-degrees of freedom. In implementations, the robotic arm may be manufactured by YASKAWA®, ABB® IRB, KUKA®, Universal Robots®. Additionally, or alternatively, the robotic may be configured to be coupled to one or more tools.

The second robot device 212 may include a second robotic arm. The second tool 222 may be coupled to an end of the second robotic arm. In some implementations, the second tool 222 may include or correspond to the first tool 120. For example, the second tool 222 may be configured to be selectively coupled to a second set of one or more objects that include the second object 142. The second set of object may be the same as or different from the first set of objects the first tool 120 is configured to be coupled to.

The third robot device 214 may include a third robotic arm. The first sensor 234 may be coupled to an end of the third robotic arm. In some implementations, the first sensor 234 is configured to generate first sensor data (e.g., 180). For example, the first sensor 234 is configured to capture one or more images of the first object 140, the second object 142, or a combination there.

The fourth robot device 216 includes a fourth robotic arm. The manufacturing tool 126 (e.g., a welding tool) is coupled to an end of the fourth robotic arm.

The second sensor 236 is configured to generate second sensor data (e.g., 180). For example, the second sensor 236 is configured to capture one or more images of the first object 140, the second object 142, or a combination there. In some implementations, the second sensor 236 is positioned on or coupled to the structure 242. The structure 242, such as a frame or weldment, may be dynamic or static. In either dynamic or static configuration of the structure 242, the second sensor 236 may be configured to be dynamic or static with respect to the structure 242—e.g., if the second sensor 236 is dynamic, the second sensor may be configured to rotate (e.g., pan) or tilt.

The positioner 240 may be configured to host (e.g., hold or securely hold) the first object 140, the second object 142, or a combination thereof. To illustrate, the positioner 240 may be dynamic or adjustable, either manually by a user or automatically by a motor. For instance, the positioner 240 may dynamically adjust its pose (e.g., position, orientation, or other physical configuration) prior to or during a welding process based on the instructions received from the controller 152. In some implementations, the positioner 240 is configured to adjust a pose or a location of an object hosted by the positioner 240 while the object is hosted by the positioner 240. For example, the positioner 240 may be configured to hold, position, or manipulate the first object 140, the second object 142, or a combination thereof. In some implementations, the positioner 240 may be configured to hold, position, or affix one or more objects, such as by using clamps or other types of fixtures. Although FIG. 2 illustrates a single positioner, in other implementations, the robot system may include multiple positioners. In some implementations, the positioner 240 may be static in nature (e.g., the positioner 240 may not be configured to adjust a pose or location of the object) in that the positioner 240 may be bins-like storage units that can host the objects. In some such implementations, the objects may be randomly positioned (e.g., in random poses) within the units.

During operation of the robot system 200, the controller 152 may perform one or more operations as described with reference to the robot system 100. Additionally, processor may perform additional operations as described herein.

The controller 152 may receive sensor data (e.g., 180) from the first sensor 234, the second sensor 236, or a combination thereof, and identify and locate the first object 140 and the second object 142. In some implementations, the controller is configured to control the third robot device to cause the at least one sensor to generate at least a portion of the sensor data 180. After identification of the first object 140 or the second object 142, the controller 152 may perform a registration process to determine a pose of the first object 140 or the second object 142. For example, the controller 152 may use registration logic 173 to determine the pose of the first object 140 or the second object 142.

In some implementations, prior to instructing the first tool 120 to pickup the first object 140, or instructing the second tool 222 to pickup the second object 142, the controller 152 may control the positioner 240 to change a pose of the first object 140 or a pose of the second object 142. In some implementations, the controller 152 may perform a registration process after the positioner 240 changes the pose of the first object 140 or the pose of the second object 142. The controller 152 may determine a first pickup location of the first object 140 or a second pickup location of the second object 142 after the positioner 240 changes the pose of the first object 140 or the pose of the second object 142.

After the first tool 120 is coupled to the first object 140 and the second tool 222 is coupled to the second object 142, the controller 152 may control the first robot device 110, the first tool 120, the second robot device 212, the second tool 222, or a combination thereof, to bring the first object 140 and the second object 142 toward being in a spatial relationship such that the seam 144 is formed between the first object 140 and the second object 142. After the first object 140 and the second object 142 are brought together (toward being in the spatial relationship), the controller 152 may confirm whether the first object 140 and the second object 142 are in the spatial relationship—e.g., confirm whether or not a separation between the first object 140 and the second object 142 is less than or equal to a threshold, such as a threshold indicated by or included in the model information. Confirming that the first object 140 and the second object 142 are in the spatial relationship, may enable the robot system 200 to ensure that the first object 140 and the second object 142 are in the spatial relationship before performing a manufacturing operation or assembly operation, such as a weld operation, on the first object 140 and the second object 142.

To confirm that the first object 140 and the second object 142 are in the spatial relationship, the controller 152 may receive additional sensor data (e.g., 180) associated with the first object 140 and the second object 142. In some implementations, the controller 152 may control the third robot device 214, the first sensor 234, or a combination thereof, to cause the first sensor 234 to generate at least a portion of the additional sensor data. The controller 152 may determine, based on the model information 164 and the additional sensor data, whether a separation between the first object 140 and the second object 142 is less than or equal to a threshold. If the separation is greater than the threshold, the controller 152 may perform the registration process on the first object 140 or the second object 142, control the first robot device 110, the first tool 120, the second robot device 212, the second tool 222, or a combination thereof, to bring the first object 140 and the second object 142 toward being in the spatial relationship, or a combination thereof. The controller 152 may determine whether or not the first object 140 and the second object 142 are in the spatial relationship after the registration process or after controlling the first robot device 110, the first tool 120, the second robot device 212, the second tool 222, or a combination thereof. If the separation is greater than the threshold, the controller 152 may generate a manufacturing instruction. In additional to execution of the manufacturing instruction, the controller 152 may control the fourth robot device 216 to position the manufacturing tool 126 in a position with respect to the seam 144. In some implementations, the controller 152 may control the first robot device 110, the first tool 120, the second robot device 212, the second tool 222, or a combination thereof, to change a pose of the first object 140 and the second object 142 while the first object 140 and the second object 142 are in the spatial relationship, such that the first object 140 and the second object 142, while in the spatial relationship, are positioned with the seam 144 adjacent to the manufacturing tool 126.

The controller 152 may send or execute the manufacturing instruction. Execution of the manufacturing instruction may cause an operation to be performed by the manufacturing tool 126. For example, the manufacturing instruction may include one or more weld instructions to cause the manufacturing tool (e.g., a weld tool) to weld a seam formed between the first and second objects, such as the seam 144 formed by the first and second objects. To illustrate, the one or more weld instructions may to cause the manufacturing tool (e.g., a weld tool) to lay a weld metal along a seam formed between the first and second objects, such as along the seam 144 formed by the first and second objects. Accordingly, the system may include one or more robot devices configured to autonomously pick a first object, a second object, or both, bring the first object together with the second object, and perform a manufacturing task (e.g., weld) on the first and second objects.

In some implementations, an assembly robotic system includes a first robot device positioned in a workspace, and a first tool coupled to the first robot device. The first tool is configured to be selectively coupled to a first object. The assembly robotic system includes a second robot device positioned in the workspace, a second tool coupled to the second robot device. The second tool is configured to be selectively coupled to a second object. The first object and the second object configured to form a first seam between the first object and the second object. The assembly robotic system also includes a third robot device positioned in the workspace, and one or more sensors configured to generate sensor data associated with the workspace. At least a first sensor of the one or more sensors coupled to the third robot device. The assembly robotic system further includes a fourth robot device positioned in the workspace, and a welding tool coupled to the fourth robot device. The welding tool is configured to weld the first seam formed between the first object and the second object. For example, the welding tool may be configured to lay a weld metal along the first seam formed between the first object and the second object. The assembly robotic system includes a controller configured to control, based on the sensor data, the first tool to be coupled to the first object at a first location on the first object, and control, based on the sensor data, the second tool to be coupled to the second object at a second location on the second object. The controller is further configured to control the first robot device, the second robot device, or both, to bring the first object and the second object into a first spatial relationship such that the first seam is formed between the first object and the second object, and generate a weld instruction to cause the weld tool weld metal the first seam to couple the first object and the second object together.

It is noted that the principles and techniques described herein (e.g., principles related to locating target objects, such as the first object 140 or the second object 142, in the workspace 102, determining the pose of the target objects, identifying the pickup location on each of the target objects, picking up the target objects, placing the target objects at in a spatial relationship or a fixed pose relative to each other, and performing a manufacturing operation (e.g., welding) on one or more objects in the spatial relationship) are not limited to the robot system 100 or the robot system 200, or other systems (such as a system of FIGS. 3 and 4) corresponding to which the principles are described. In other words, the principles are not limited to a 1-robot system or a 4-robot system; rather, the principles may be used to implement an n-robot system, where n is a positive integer.

Figure 3:
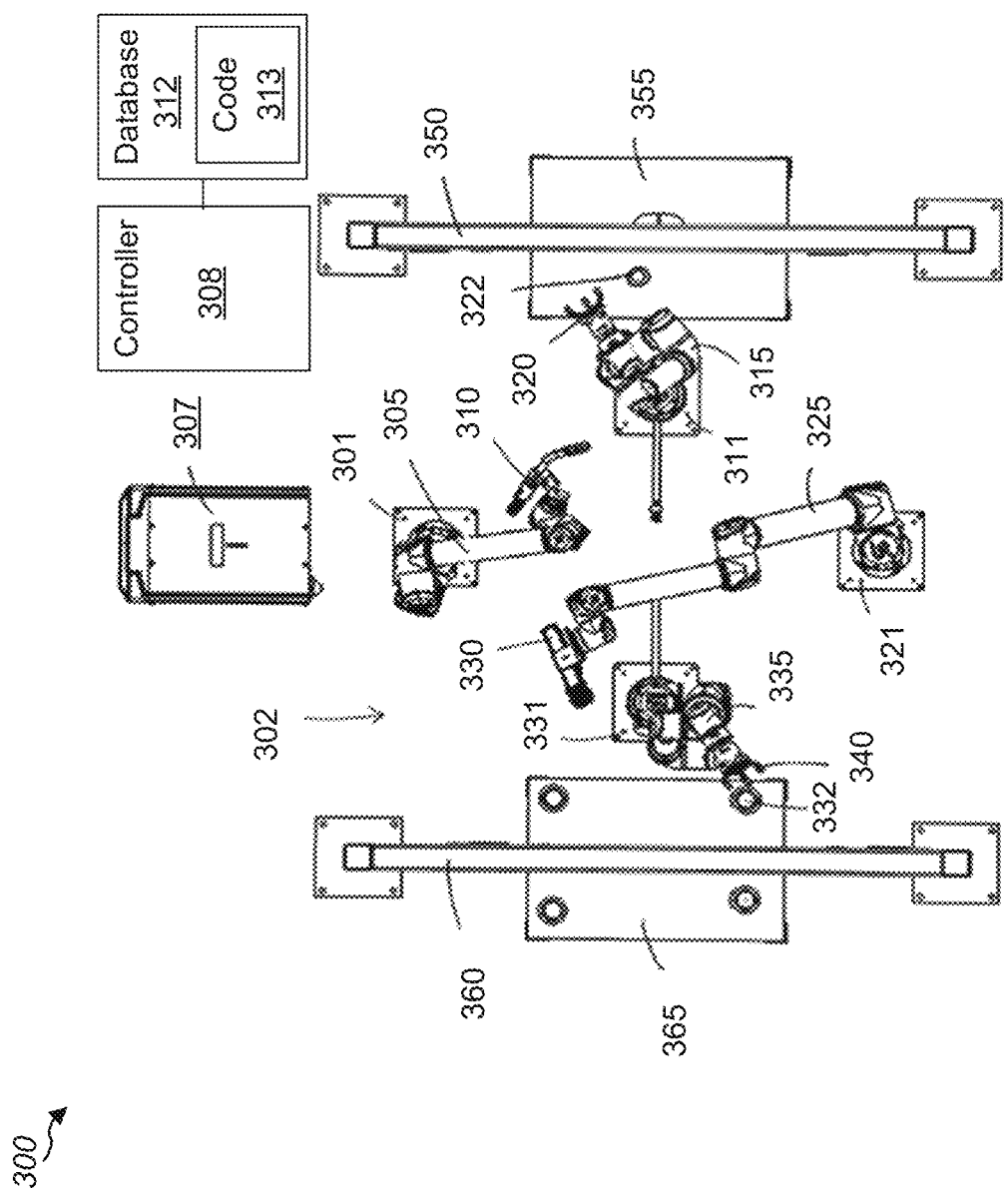
FIG. 3 is a diagram illustrating details of another example of a robot system according to one or more aspects.
Figure 4:
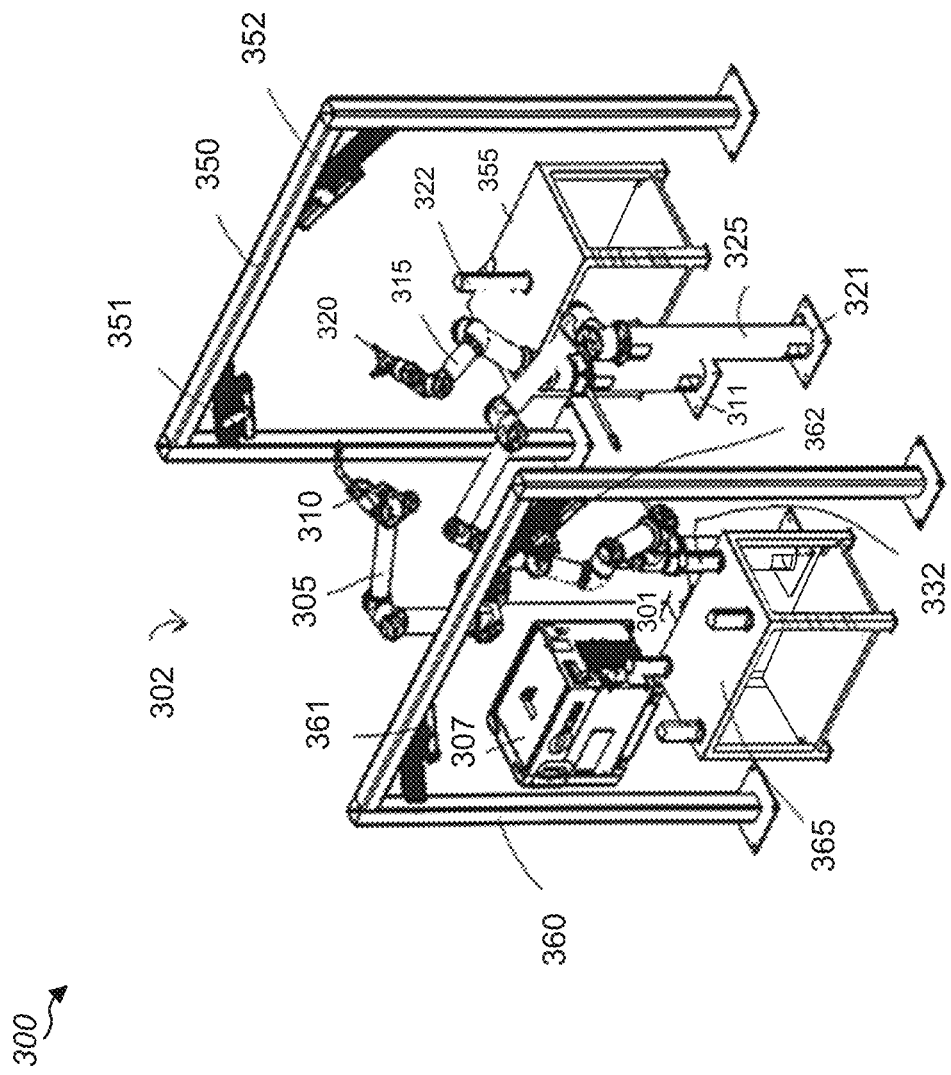
FIG. 4 is a perspective view illustrating details of the robot system of FIG. 3 according to one or more aspects.

Referring to FIG. 3, a diagram illustrating details of an example of a robot system 300 according to one or more aspects. In some implementations, the robot system 300 may include or correspond to the robot system 100 or the robot system 200. Additionally, referring to FIG. 4, FIG. 4 is a perspective view illustrating details of the robot system 300 of FIG. 3 according to one or more aspects. The robot system 200, such as a robot assembly system, includes or is associated with a workspace 302. The workspace 302 may include or correspond to the workspace 102.

Figure 13:
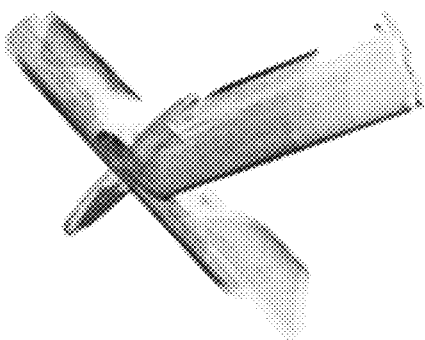
FIG. 13 includes images of another example of a registration process according to one or more aspects.

Referring to FIG. 3, in some implementations, the robot system 300 may include multiple robots 301, 311, 321, and 331, frames 350 and 360; a weld controller 307, a main controller 308 (hereinafter referred to as "controller 308"), and positioners 355 and 365, which may be hosting the objects 322 and 332, respectively. Referring still to FIG. 13 the workspace 302, and specifically the one or more sensors (hereinafter referred to a "sensor 130"), the weld controller 307, the positioners 355 and 365, and the robots 301, 311, 321, and 331 within the workspace 302, are (at least communicatively) coupled to the controller 308.

The robots 301, 311, 321, and 331 may include or correspond to the robot devices of FIGS. 1 and 2. For example, the robot 311 may include or correspond to the first robot device 110, the robot 331 may include or correspond to the second robot device 212, the robot 321 may include or correspond to the third robot device 214, and the robot 301 may include or correspond to the fourth robot device 216.

The positioners 355 and 365 may include or correspond to the positioner 240. Additionally, the objects 322 and 332 may include or correspond to the first object 140 and the second object 142. The frames 350 and 360 may include or correspond to the structure 242. The sensor 330 of the robot system 300 may include or correspond to the sensor 130, such as the first sensor 234, the second sensor 236, or a combination thereof. The weld controller 307 may include or correspond to the control device 150, such as the controller 152 (e.g., the control logic 170). The controller 308 may include or correspond to the control device 150, such as the controller 152.

Each of the multiple robots 301, 311, 321, and 331 may include a robotic arm providing—as a non-limiting example—six-degrees of freedom. In some implementations, the robotic arms 305, 315, 325, and 335 of robots 301, 311, 321, and 331, respectively, can be any suitable robotic arms such as manufactured by YASKAWA®, ABB® IRB, KUKA®, Universal Robots®. The robotic arms 305, 315, 325, and 335 may have one or more tools coupled at their ends. The multiple robots 301, 311, 321, and 331 may include robotic arms 305, 315, 325, and 335, and each of the robotic arms 305, 315, 325, and 335 may attach to tools 310, 320, 330, and 340, respectively. As an example, based on the functionality the robot performs, the robot arm can be coupled to a tool configured to enable (e.g., perform at least a part of) the functionality. To illustrate, the robotic arm 305 may be coupled to a welding tool—making the robot 301 a welding robot. Similarly, the robotic arm 315 may be coupled to one or more sensors—which may make the robot 311 a sensing robot. The robot arms 325 and 335 may be coupled to picking tools, making them the picking robots. In some implementations, a single robot may perform multiple functionalities. For example, both a welding tool and one or more sensors may be coupled to a robotic arm such that a single robot may perform both the functionalities of sensing and welding. In some implementations, it may be assumed that a single picking robot picks a single object. However, in other implementations where one single picking robot cannot pick an object (e.g., the weight of the object is above the weight carrying capacity of a single robot), two or more picking robots may be configured to pick that object.

The 330 may be positioned on a robot arm, e.g., the robot arm 325. In some implementations, the sensor 330 may be positioned on a welding robot arm (e.g., on the robot arm that has a welding tool attached thereto). Additionally, or alternatively, the sensor 330 may be positioned on structures or the frames 350 and 360 positioned in the workspace 102, as described and shown herein at least with reference to FIG. 4. In some Implementations, the sensor 330 may be positioned in one or more of the configurations described above. For example, the workspace 302 may include a combination of one or more sensors (e.g., 330) on the robot arms and one or more sensors (e.g., 330) on the frames 350 or 360. The functionality of the sensor 330 is described in detail below in tandem with the controller 308.

The sensor 330 may be image sensors configured to capture visual information (e.g., two-dimensional (2D) images or three-dimensional (3D) scanning) about the workspace 302. For instance, the sensors may include cameras (e.g., cameras with built-in lasers), scanners (e.g., laser scanners), etc. In some implementations, the sensor 330 may include sensors such as Light Detection and Ranging (Li-DAR) sensors. Alternatively or in addition, the sensor 330 may be audio sensors configured to emit and/or capture sound, such as Sound Navigation and Ranging (SONAR) devices. Alternatively or in addition, the sensor 330 may be electromagnetic sensors configured to emit and/or capture electromagnetic (EM) waves, such as Radio Detection and Ranging (RADAR) devices. Through visual, audio, electromagnetic, and/or other sensing technologies, the sensor 330 may collect information about physical structures and objects in the workspace 302. In some examples, the sensor 330 may collect static information (e.g., stationary structures in the workspace), and in other examples, the sensor 330 may collect dynamic information (e.g., moving structures in the workspace), and in still other examples, the sensor 330 may collect a combination of static and dynamic information. The sensor 330 may collect any suitable combination of any and all such information about the physical structures in the workspace 302 and may provide such information to other components (e.g., the controller 308) to generate a 3D representation of the physical structures (e.g., the positioners 355, 365, the objects 322, 332, and the robots 301, 311, 321, 331, or a combination thereof, etc.) in the workspace 302. As described above, the sensor 330 may capture and communicate any of a variety of information types, but this description assumes that the sensor 330 primarily capture visual information (e.g., 2D images or 3D scans) of the workspace 302, which are subsequently used en masse to generate 3D representations of the workspace 302 (or objects positioned in the workspace 302) as described below.

The positioners 355 and 365 are configured to hold, position, and/or manipulate the objects 322 and 332, respectively. In some implementations, the positioners 355, 365 may hold, position, or affix the objects, for example, using clamps or other types of fixtures. For example, the positioners 355 and 365 may be configured to securely hold the objects 322 and 332. In some implementations, the positioners 355 and 365 are dynamic or adjustable, either manually by a user or automatically by a motor. For instance, the positioners 355 and 365 may dynamically adjust their poses (e.g., position, orientation, or other physical configuration) prior to or during a welding process based on the instructions received from the controller 308, as is described below. Although FIG. 3 illustrates objects 322 and 332 positioned on different positioners (e.g., positioners 355 and 365, respectively), in some implementations, the objects 322 and 332 may be positioned on the same positioner. Additionally, or alternatively, the positioners 355 and 365 may be bins-like storage units that can host the objects. In such implementations, the objects may be randomly positioned (e.g., in random poses) within the units.

The weld controller 307 may have the electronic and computational hardware to appropriately control the welding process performed via the welding tool attached at the end of a robotic arm. In some implementations, the weld controller 307 may have the ability to communicate with other computerized devices (e.g., controller 308 described below), where the communication may include controls or actions demanded from any appropriate device or may mean it can send information about the state of the welding tool, a weld or welds being applied, or about the weld controller itself. The weld controller 307 can also function as or coordinate with a welding power supply.

Referring still to FIG. 3, the workspace 302, and specifically the sensor 330, the weld controller 307, the positioners 355 and 365, and the robots 301, 311, 321, and 331 within the workspace 302, are (at least communicatively) coupled to the controller 308. The controller 308 is any suitable machine that is specifically and specially configured (e.g., programmed) to perform the actions attributed herein to the controller 308, or, more generally, to the robot system 300. In some examples, the controller 308 is not a general-purpose computer and instead is specially programmed and/or hardware-configured to perform the actions attributed herein to the controller 308, or, more generally, to the robot system 300. In some examples, the controller 308 is or includes an application-specific integrated circuit (ASIC) configured to perform the actions attributed herein to the controller 308, or, more generally, to the robot system 300. In some examples, the controller 308 includes or is a processor, such as a central processing unit (CPU), graphics processing unit (GPU), and the like. In some examples, the controller 308 is a field programmable gate array (FPGA). In other examples, the controller 308 includes memory storing executable code, which, when executed by the controller 308, causes the controller 308 to perform one or more of the actions attributed herein to the controller 308, or, more generally, to the robot system 300. The controller 308 is not limited to the specific examples described herein.

The controller 308 controls the one or more sensors, the weld controller 307, the positioners 355 and 365, and the robots 301, 311, 321, and 331 (including the tool attached to the robot arms) within the workspace 302. For example, the controller 308 may control the robot that has one or more sensors (e.g., 330) attached thereto to move within the workspace 302 to capture data (e.g., one or more images, audio data, and/or EM data as described below). For example, the controller 308 may control the robots to locate one or more objects within the workspace 302, pick one or more of the objects at a specific pick-up location, bring the one or more objects closer, and perform welding operations according to a weld plan. In some implementations, the controller 308 may also manipulate the positioners to rotate, translate, or otherwise move one or more objects within the workspace 302. The positioner may be controlled by the controller 308 to change the pose of the part positioned thereon. For example, the positioners may be motorized in that they can be actuated to move/rotate (or change pose of) an object relative to the ground or welding robot. The controller 308 may also control other aspects of the robot system 300. For example, the controller 308 may further interact with a user interface (UI) (not expressly shown in FIG. 3) by providing a graphical interface on the UI by which a user may interact with the robot system 300 and provide inputs to the robot system 300 and by which the controller 308 may interact with the user, such as by providing and/or receiving various types of information to and/or from a user (e.g., identified seams that are candidates for welding, possible weld plans, welding parameter options or selections, etc.). The UI may be any type of interface, including a touchscreen interface, a voice-activated interface, a keypad interface, a combination thereof, etc.

Furthermore, the controller 308 may interact with the database 312, for example, by storing data to the database 312 and/or retrieving data from the database 312. The database 312 may include or correspond to the memory 156. The database 312 may more generally be stored in any suitable type of storage that is configured to store all types of information. In some examples, the database 312 can be stored in storage such as a random-access memory (RAM), a memory buffer, a hard drive, an erasable programmable read-only memory (EPROM), an electrically erasable read-only memory (EEPROM), a read-only memory (ROM), Flash memory, and the like. In some examples, database 312 may be a cloud-based platform. The database 312 may store any information useful to the robot system 300 in performing assembly operations. For example, the database 312 may store information captured by one or more sensors. The database 312 may further store one or more CAD models, for example, of the objects 322 and 332, of a final assembly of the objects 322 and 332. As another example, the database 312 may store an annotated version of a CAD model of the objects 322 and 332 and/or the final assembly of the objects 322 and 332. The database 312 may also store a point cloud of the objects generated using the CAD model (also herein referred to as CAD model point cloud). Similarly, welding instructions or weld plans for the objects 322 and 332 may be stored in the database 312. In some implementations, the database 312 may further store tool center point (TCP) information related to the tools coupled with the robotic arms. For example, the database 312 may include TCP information of the welding tool, gripper, etc.

In examples, the storage stores executable code 313, which, when executed, causes the controller 308 to perform one or more actions attributed herein to the controller 308, or, more generally, to the robot system 300. In some examples, the executable code is a single, self-contained, program, and in other examples, the executable code is a program having one or more function calls to other executable code which may be stored in storage or elsewhere. Additionally, or alternatively, one or more functions attributed to execution of the executable code may be implemented by hardware. For instance, multiple processors may be useful to perform one or more discrete tasks of the executable code.

Referring again to the sensors, the controller 308 is configured to receive data (e.g., image data such as 2D images, 3D images, and, possibly, other data, such as audio data or electromagnetic data) from the sensors. In some implementations, the information captured by the sensor 330 may be used to generate 3D representations of the structures captured in the images. The 3D representations may include point clouds. A point cloud can be a set of points each of which represents a location in 3D space of a point on a surface of the elements (e.g., objects 322, 332, positioners 355, 365, etc.) in the workspace 302.

In some examples, one or more images (e.g., 2D image data captured by the sensor(s) 330 at a particular orientation relative to objects 322, 332) may be overlapped or stitched together by the controller 308 to reconstruct and generate 3D image data of the workspace 302. The 3D image data can be collated to generate the point cloud with associated image data for at least some points in the point cloud. In examples, the 3D image data can be collated by the controller 308 in a manner such that the point cloud generated from the data can have six degrees of freedom. For instance, each point in the point cloud may represent an infinitesimally small position in 3D space. As described above, the sensor(s) 330 can capture multiple 2D images of the point from various angles. These multiple 2D images can be collated by the controller 308 to determine an average image pixel for each point. The averaged image pixel can be attached to the point. For example, if the sensor(s) 330 are color cameras having red, green, and blue channels, then the six degrees of freedom can be {x-position, y-position, z-position, red-intensity, green-intensity, and blue-intensity}. If, for example, the sensor(s) 330 are black and white cameras with black and white channels, then four degrees of freedom may be generated.

In some implementations, instead of using sensors that capture 2D images, 3D sensors (such as scanners sold by Photoneo®) may be implemented. In some implementations, 3D sensors may use structured light projection to reconstruct the geometry of a 3D surface of an inspected object (e.g., object 322). For example, one or more structured patterns may be projected onto a scene during scan, which may allow calculation of depth from one or more images of the scene. Following the scan, information regarding the surface geometry of the scanned object and/or scene may be provided to the controller 308, e.g., as a depth map or in the form of a point cloud. In some implementations, the scanning process of the sensors consists of three phases: capturing (or acquisition), processing (computation) and transfer. In the first stage, the sensor may project a series of light patterns onto the scene. Once the data has been acquired, the sensor (in coordination with controller 308) may calculate the visible points on the scene and send this data to the controller 308, e.g., via Ethernet connection or other communication protocols such as Wi-Fi.

Referring to FIG. 4, FIG. 4 of the robot system 300 shows an example position of additional sensors (e.g., 330, such as sensors 351, 352 and 361, 362 within the workspace 302. For example, the sensors 351, 352 and 361, 362 may be positioned on the frames 350 and 360, respectively. Although sensors 351, 352, 361, and 362 are positioned on frames 350 and 360 and affixed at the corners of the frames 350 and 360, the placement of the sensors 351, 352, 361, and 362 may differ. As an example, the sensors 351, 352, 361, and 362 may be affixed at a different location on the frame 350, 360. Additionally, or alternatively, the frame 350, 360 may be static in nature; however, the sensors 351, 352, 361, and 362 positioned on such frame may be movable. For example, each of the sensors 351, 352, 361, and 362 may be configured to bend or rotate in order to scan the workspace 302. Additionally, or alternatively, both the frames and the sensors may be movable.

The shape of the frames 350 and 360 shown in FIGS. 3 and 4 is for illustrative purposes only. In some implementations, frames with different shapes may be employed. For example, the one or more sensors may be coupled to a tripod-style frame structure, where each of the sensors may be configured to bend or rotate in order to scan the workspace 302. In some implementations, the use of frames may be avoided and the sensors 351, 352, 361, and 362 may be positioned on the ground. In such implementations, the sensors may be movable, e.g., sensors may be configured to bend or rotate.

Figure 5:
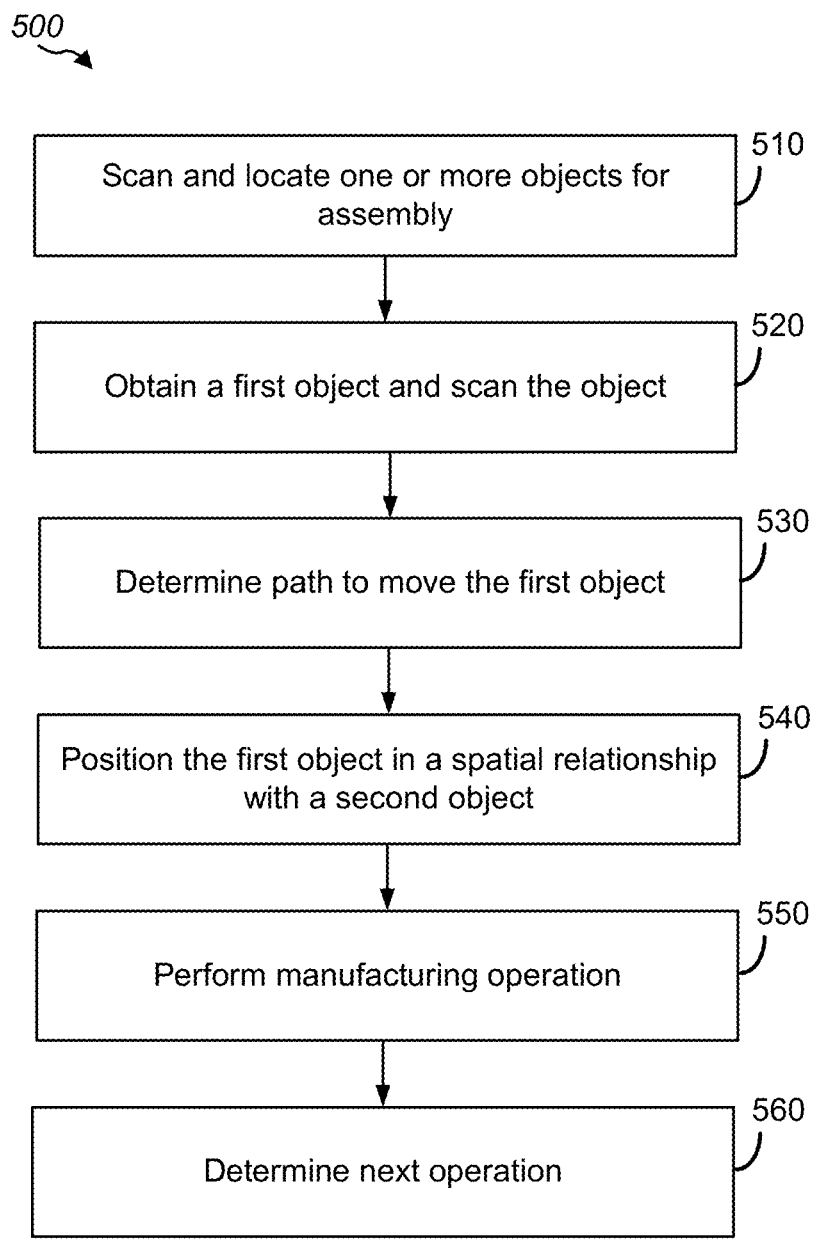
FIG. 5 is a flow diagram illustrating an example process for performing an assembly task using autonomous assembly robots according to one or more aspects.

FIG. 5 is a flow diagram illustrating a process (e.g., a method 500) for performing an assembly task using autonomous assembly robots, in accordance with various examples. The method 500 disclosed in FIG. 5 is described in tandem with the robot system 300 shown in FIGS. 3 and 4. To reiterate, FIGS. 3 and 4 illustrate a 4-robot system in which two of the robotic arms (e.g., robotic arms 315 and 335) are configured to be utilized for picking objects (e.g., the robotic arm 315 may pick the object 322 and the robotic arm 335 may pick the object 332); the robotic arm 325 may be configured to be used for scanning (e.g., perceiving) the workspace (and the objects 322 and 332 within the workspace); and the last one of the four robotic arms (e.g., robotic arm 305) may be used for welding the objects (e.g., parts picked up by the robotic arms configured to pick parts). It is noted that one or more aspects of the method 500 are also applicable to the robot system 100 of FIG. 1 or the robot system 200 of FIG. 2.

The method 500 is now described in tandem with the 4-robot system shown in FIGS. 3 and 4. The method 500, at 510, includes the robot system 300 scanning and locating one or more objects for assembly. For example, the robot system 300 may locate different part which are to be picked up and assembled. At 520, the robot system 300 obtains a first object and scans the first object. For example, the robot system 300 may pick-up an object 322 from the positioner 355 or an object 332 from the positioner 365 and rescan the objects 322, 332 to improve the accuracy of an object position on a tool of a robot arm.

At 530, the robot system 300 determines a path to move the first object. For example, the robot system 300 may perform an algorithm to bring picked-up objects together based on a reachability and mobility of one or more robots included in the robot system 300. At 540, the robot system

300 positions the first object in a spatial relationship (e.g., a fixed pose) with a second object. For example, the robot system 300 may implement a visual servoing approach to find positions of the objects with high-accuracy using a perceiver and may move the objects relative to each other to bring the objects to a desired position or relationship.

At 550, the robot system 300 performs a manufacturing operation. For example, the robot system 300 may implement a visual servicing approach to find a position of a weld tool and move the weld tool to a desired position and operate the weld tool. At 560, the robot may determine a next operation. For example, the robot system 300 may release the first object, the second object, or both the first and second objects. After releasing one or both of the first and second objects, the method 500 may return to 510 to identify one or more objects for a next assembly task. Additionally, or alternatively, after releasing one of the first object or the second object, the method 500 may return to 520 and obtain a scan of the first and second objects that are coupled together.

Additionally, details of one or more operations that may be performed as part of the method 500 are described further herein. With reference to 510 of the method 500, the robot system 300 scans the workspace 302 using one or more sensors, such as sensor 330 affixed to a robot. Additionally, or alternatively, the workspace 302 may also be scanned using sensors positioned elsewhere within the workspace, e.g., on a frame. For example, the workspace 302 may be scanned using the sensors 351, 352, 361, and 362 positioned on the frames 350 and 360.

Figure 6:
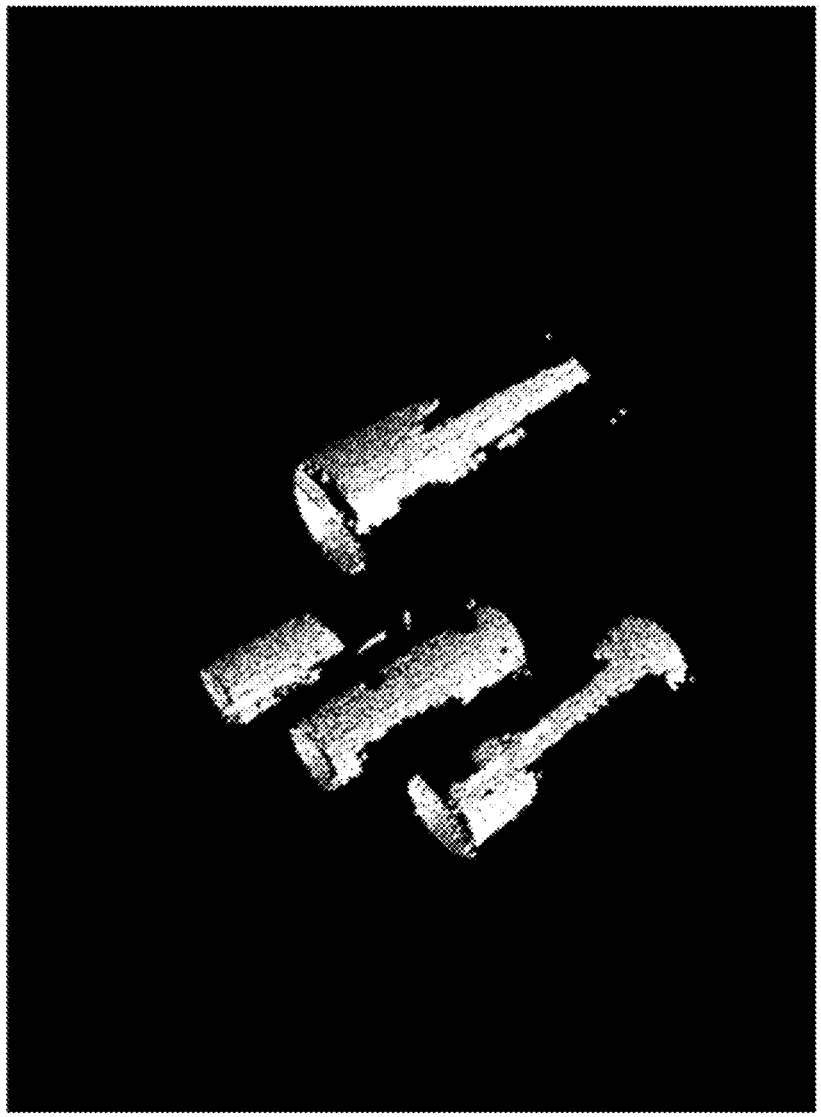
FIG. 6 is an image of a 3D representation of point clouds of multiple parts according to one or more aspects.

The data captured by the sensors may be used to generate a 3D representation of the workspace 302 or of the elements (e.g., objects) within the workspace 302. An example of such 3D representation is described further herein at least with reference to FIG. 6. Referring to FIG. 6, FIG. 6 is an image of a 3D representation of point clouds of multiple parts. The multiple parts (e.g., objects) are positioned on a positioner, such as positioner 365.

Referring to FIG. 5, in implementations in which multiple objects are included in the scene or the workspace 302 (e.g., multiple robots and positioners, with each positioner having multiple objects positioned thereon), the robot system 300 may perform a clustering algorithms (e.g., K-means, affinity propagation, DBSCAN, mean shift, etc.) to segment or partition the 3D representation in different classes or clusters. Additionally, or alternatively, the clustering algorithm may locate and identify target objects within the 3D representation. The target objects may include the objects to be assembled or another object.

In some implementations, the target objects may be located and identified within the 3D representation based on a representation of the final assembled object. In some examples, the representation of the final assembled object includes a CAD model (or a point cloud of the CAD model) of the final assembled object, which may be provided to the controller 308 (and stored in the database 312) before the beginning of or during the assembly process. In some implementations, controller 308 may use some information (e.g., annotations from a user, shape of the objects forming the final object, identity information of the objects forming the final assembled object present in the CAD file, etc.) present in the representation of the final assembled object to identify and locate the target objects within the 3D representation of the scene. In some implementations, the controller 308 may implement shape-identifying algorithms to determine the shape of the objects within the 3D representation. For example, the controller 308 may determine the shapes of the objects in the final assembled object present in the CAD file (e.g., either shape information in the file or by implementing feature or shape recognition algorithms) and use that determined shape to identify the target objects in the 3D representation. In some implementations, the annotations from the user may include seam annotations, annotation corresponding to the locations at which tack welds are to be performed, and the like.

In operation, the sensors capture one or more images of the workspace 302, and the captured one or more images may be converted into one or more 3D representations. The clustering algorithms—informed by the information captured from the CAD model of the final assembled object—may then be implemented on the one or more 3D representations. As noted above, the information captured from the CAD model may include the shape of the objects forming the final object, and the shape of the objects may be used to classify and identify the target objects from the 3D representation of the scene.

In some implementations, the use of clustering algorithms to identify the target objects in the 3D representation may be circumvented (e.g., not used) in implementations where the target objects have identity information (e.g., unique ID information) associated therewith. This identity information may be present in the CAD model of the final assembled object. Additionally or alternatively, the identity information may be loaded (or provided) to the controller 308 when the objects are placed on the positioners 365, 355 (e.g., by one or more sensors scanning the IDs of the target objects). In such implementations, after generating the 3D representation of the scene and receiving the unique IDs associated with the objects forming the final assembled object, the controller 308 may identify the target objects within the 3D representation using their unique IDs or other information provided to the controller 308 (e.g., the 3D representation may project or note the unique IDs of the objects in the 3D representation).

In some implementations, the ID information may be carried by an RFID tag on the target objects and the RFID tags may contain the unique identification information associated with the object. Additionally, or alternatively, the objects positioned on the positioner may include a barcode, a ArUco marker (e.g., a QR code), or a serial number containing the unique ID associated with the object. In operation, the one or more sensors may scan the ID markers (e.g., ArUco, RFID, and the like) and correlate the scanned information with the object ID information in the CAD model of the final assembly object to identify the target objects. In some implementations, the unique ID may also include additional information regarding the object, such as geometric configuration (e.g., shape and dimensions) of the object, physical characteristics (e.g., weight) of the object, and other related information.

Once the target objects are identified, the target objects may be located within the workspace 302. For example, if the controller 308 identifies the target objects, the controller 308 may determine their location within the 3D representation of the workspace 302, which may be translated to the real-life location of the objects. In operation, after identifying the target objects within the 3D representation, the controller 308 may identify the location of the target objects in the workspace 302. In some implementations, the target objects may be positioned on the same positioner, or the target objects may be positioned on different positioners. As shown in FIGS. 3 and 4, the target objects (e.g., objects 322 and 332) are positioned on separate positioners (e.g., positioners 355 and 365).

With reference to 520 of the method 500, the robot system 300 picks up the target objects. Although the controller 308 has located the target objects, in some implementations, it may be beneficial to refine that information and determine the pose of the target objects. Determining the pose of the target objects may assist in determining the location at which the pickup robot (e.g., the robot 311 including the robotic arm 315) may pick the target object. It is noted that the location at which the robot may hold the object may be referred to as pickup location. The location at which the pickup robot may pickup/hold the target object may at least partially depend on the pose at which the object is positioned on the positioner. At least some information regarding the pose (e.g., position and orientation) of the object may be determined using a registration technique. The registration technique may be include or be associated with the registration logic 173.

Figure 7:
FIG. 7 includes images of an example of a registration process according to one or more aspects.

The registration process is configured to transform or align data from different sources (e.g., CAD model point cloud and 3D representation) with the same coordinate frame or system. To illustrate, the controller 308 may perform the registration process using the point cloud of a CAD model of the target object and the 3D representation of the target object (generated using the data captured from the one or more sensors) by sampling the CAD model point cloud and the 3D representation. The sampling is performed such that the points in the CAD model point cloud and the 3D representation have a uniform or approximately uniform dispersion or equal or approximately equal point density. Following sampling, the coordinate systems of the model and the scanned information may be coarsely (with resolution of 1 cm) and finely (e.g., with a resolution of 1 mm) aligned. Referring to FIG. 7, FIG. 7 includes images an example of a registration process. For example, FIG. 7 includes a first image of a 3D representation of a set of objects prior to registration, and a second image of a 3D representation of the set of objects after registration.

Referring again to FIG. 5, after the object is scanned, located, registered, and the target object's pose is determined, the target object may be picked up by their corresponding picking robot. For example, object 322 may be picked up by the robot 311 including the robotic arm 315, and object 332 may be picked up by the robot 331 including the robotic arm 335.

As described herein, the target object, at least partially, assumes the shape of a hollow cylinder, and the picker or gripper is a three-finger gripper, such as one manufactured by OnRobot®. Examples, of the picker or gripper coupled to the target object are described further herein with reference to FIGS. 8A-8C. In other implementations, the target object may have a different shape, the picker or gripper may be a picker or gripper other than the three-finger gripper, or a combination thereof. It is noted that the location at which the pickup robot may grasp or hold the target object may at least partially depend on the geometric configuration (e.g., shape) of the target object. Additionally, or alternatively, the location at which the pickup robot may hold the target object may at least partially depend on the type of picker or gripper used to hold or pick the object.

Figure 8C:
FIGS. 8A-8C are images of examples of different grasping positions of a fingers-based gripper with a cylindrical object according to one or more aspects.
Figure 8B:
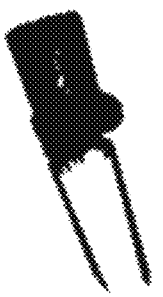
Figure 8A:

Referring to FIGS. 8A-8C, FIGS. 8A-8C include images of examples of different grasping positions of a fingers-based gripper with a cylindrical object. To illustrate, FIG. 8A shows an edge-external grasp—a grasp in which the three fingers of the picker grasp the cylindrical object externally. FIG. 8B shows an edge internal grasp—grasp in which the fingers of the picker are inside the hollowed portion of the cylinder. FIG. 8C shows the side grasp in which the picker grasps the object from the side.

Referring again to FIG. 5, in some implementations, the controller 308 may perform kinematic reachability analysis and collision analysis on the possible grip locations to determine a final grasp pose. The kinematic reachability analysis and collision analysis may include or correspond to the kinematic reachability analysis and collision logic 174. In evaluating kinematic reachability and collision, the controller 308 may perform multiple different computations. In some examples, these computations may be mutually exclusive from one another. In some examples, kinematic feasibility computation computes whether the arm of the picking robot can mechanically reach (or exist) needed to pick the target object from the pickup location. In some examples, in addition to the kinematic feasibility computation, collision computation may be performed. The controller 308 may use a flexible collision library (FCL) in performing the collision computation. The FCL includes various techniques for efficient collision detection and proximity computations, as a tool in the collision avoidance analysis or computation. The FCL is useful to perform multiple proximity queries on different model representations, and it may be used to perform probabilistic collision identification between 3D representations. Additional or alternative resources may be used in conjunction with or in lieu of the FCL.

The collision computation is configured to determine whether the arm of the robot will encounter a collision (e.g., collide with anything in the workspace 302) when accessing when going to pick the object. The controller 308 may perform the first computation before performing the second computation. In some examples, the second computation may be performed only if the result of the first computation is positive (e.g., if it is determined that the arm of the robot 301 can mechanically reach (or exist) at the state). In some examples, the second computation may not be performed if the result of the first computation is negative (e.g., if it is determined that the arm of the robot 301 cannot mechanically reach (or exist) at the state). Using the kinematic and collision analysis, one of the three pickup locations may be selected or finalized.

Figures 9, 10:
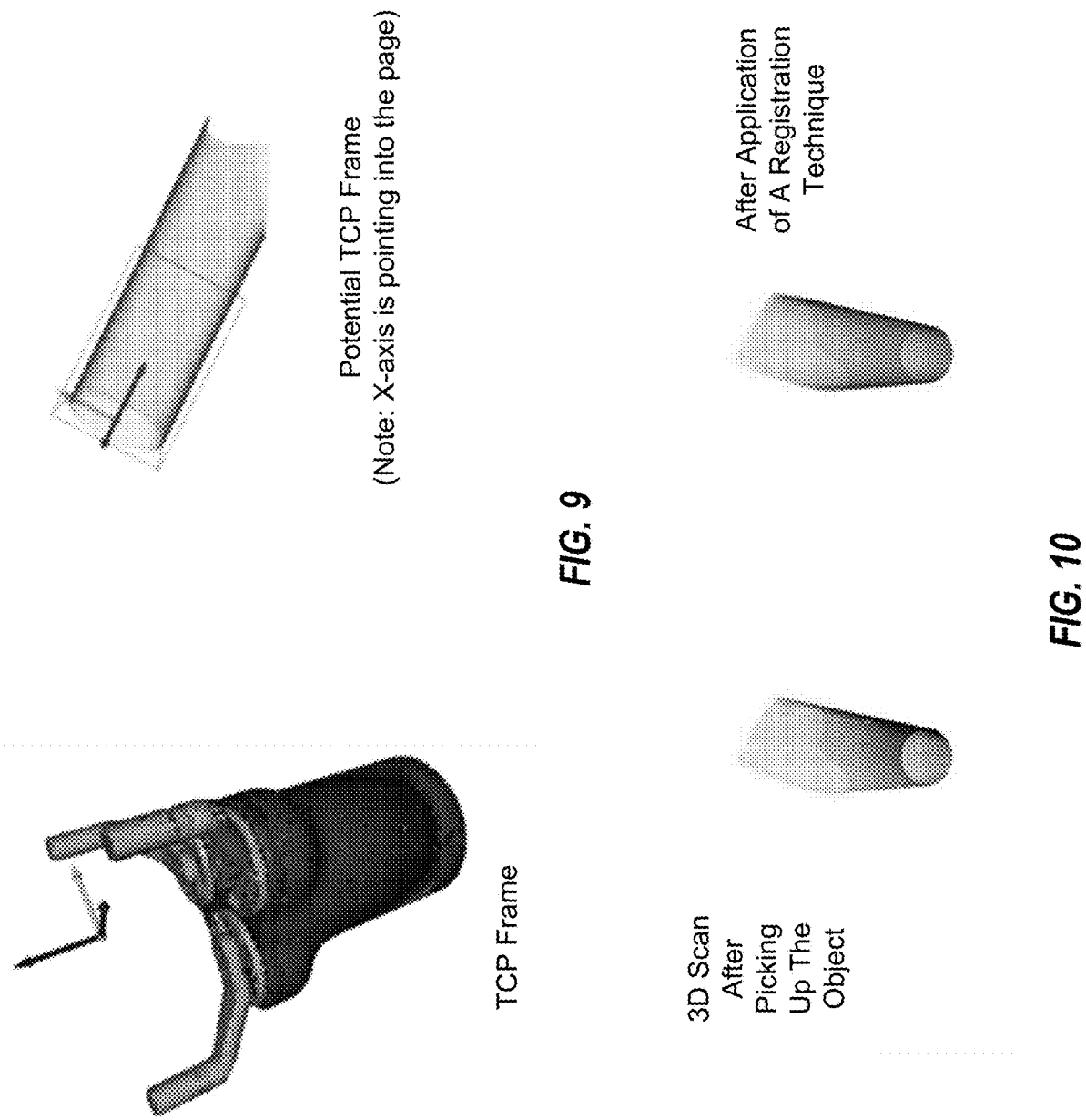
FIG. 9 includes images of examples of a tool center point (TCP) of a gripper and a desired coordinate frame of an object according to one or more aspects.
FIG. 10 includes images showing a 3D representation of the picked up object before and after registration according to one or more aspects.

After the final grasp position is determined, the controller 308 may assign a desired coordinate frame value to the target object. The controller 308 may then use the desired coordinate frame of the target object to grasp the target object. For example, the controller 308 may move the TCP of the gripper to the desired coordinate frame to pick the object. Referring to FIG. 9, FIG. 9 includes images of examples of TCP of the gripper and the desired coordinate frame of the object (referred to as potential TCP frame).

Referring again to FIG. 5, although optional, in some implementations, after picking the target object, the controller 308 may instruct the sensors (either static sensors on the frames or the sensors coupled to a robotic arm) to rescan the target object. The rescanning process may include capturing one or more images of the picked up object from multiple different angles. The captured data may be combined to generate a composite scan on which the above-described registration technique may be employed. The re-application of the registration process may use the composite scan instead of the 3D representation of the target object generated after the initial scan. The re-application of the registration technique may provide controller 308 a more accurate view of the reality. Referring to FIG. 10, FIG. 10 includes images showing a 3D representation of the picked up object before and after registration.

Figure 11:
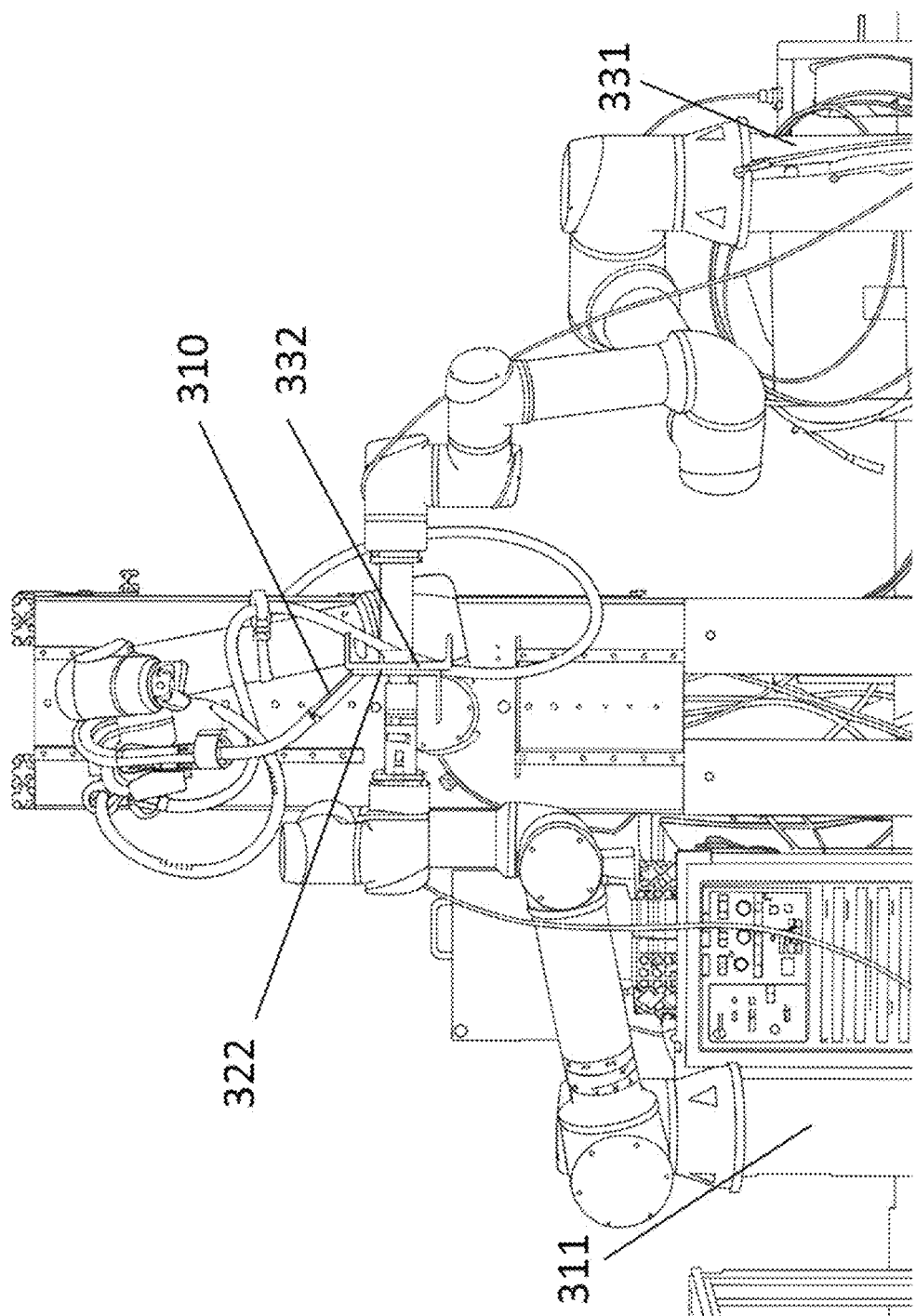
FIG. 11 an image of an example of two objects positioned together in a fixed pose in space.

Referring again to FIG. 5 and with reference to 530 of the method 500, after the pickup location is determined and an object is picked up, the robot system 300 may bring the picked up object in a fixed pose relative to another object. This other object may be another target object which is picked up by a different picking robot using the techniques described above. To illustrate, the robot 331 may pick the object 332 and the robot 311 may pick the object 322. At 530, the robots 311 and 331 may perform coordinated movements to bring the objects 322 and 332 to a fixed pose relative to one another. In some implementations, the objects 322 and 332 may be positioned in a fixed pose in the space as shown with reference to FIG. 11. Referring to FIG. 11, FIG. 11 is an image of an example of two objects positioned together in a fixed pose in space. For example, FIG. 11 shows the object 322 coupled to the robot 311 and the object 332 coupled to the robot 331. As shown, the objects 322 and 332 are positioned together in a fixed pose in space—e.g., in a spatial relationship. FIG. 11 also shows robot 301 positioned to perform a weld operation on the objects 322 and 332.

In some implementations, the objects 322 and 332 at the fixed relative pose may physically touch each other and form a seam. In other implementations, the objects 322 and 332 may not be in contact with each other and have a gap between them. In some implementations, the gap may be in the range of 0.1 mm-1 cm. In some implementations, this gap may be reduced and the objects 322 and 332 may be brought together to make contact using the technique described with reference to 540 of the method 500. In other implementations, this gap may not be reduced and the objects 322 and 332 may remain in the fixed pose and a manufacturing task is performed on them while they are in a fixed pose where the objects 322 and 332 are not in physical contact with each other.

Referring again to FIG. 5, in some implementations, the following technique (referred to herein as objects joining technique) may be used to bring the parts to a fixed relative pose. The objects joining technique may determine how to orient the objects in space relative to each other and manage the mobility and reachability constraints related to the picking robots and the welding robot to position the objects in a fixed pose and perform a manufacturing task on them, such as welding.

In some implementations, the objects joining technique may include defining a hypothetical space in the workspace 302 in which the objects may be assembled. This hypothetical space may be or be defined by a bounding, or a cube, of a certain length, width, and height. In some implementations, the controller 308 may perform kinematic reachability analysis and collision analysis on the robots that may be required to enter the hypothetical space. For example, the controller 308 may perform reachability analysis and collision analysis on the picking robots to determine whether the robots can exist in one or more states in the hypothetical space (alone or together with the other object). In some implementations, the controller 308 may consider a pose of one of the objects as a reference pose and then perform reachability analysis and collision analysis on the second object with respect to the reference pose of the first object. The reachability analysis and collision analysis may be performed in light of the CAD model of the assembled objects. The controller 308 may also perform reachability analysis and collision analysis on the welding robot such that the welding tool should be able to exist in the states according to the weld plan. For example, the controller 308 may perform reachability analysis and collision analysis based on the position(s) of tack welds that are to be performed on the objects. The reachability analysis and collision analysis may be similar to the reachability analysis and collision analysis described above with reference to 520 of the method 500.

Figure 12:
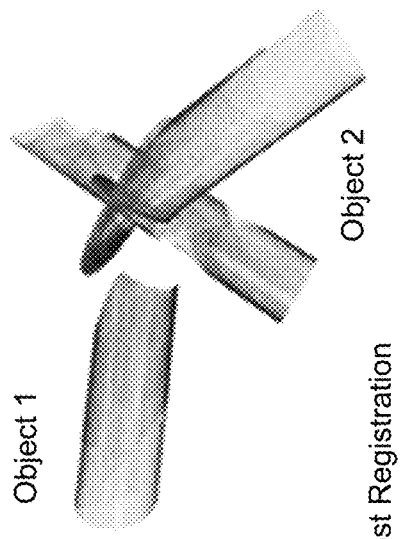
FIG. 12 includes images of an example of a registration process according to one or more aspects.
Figure 12:
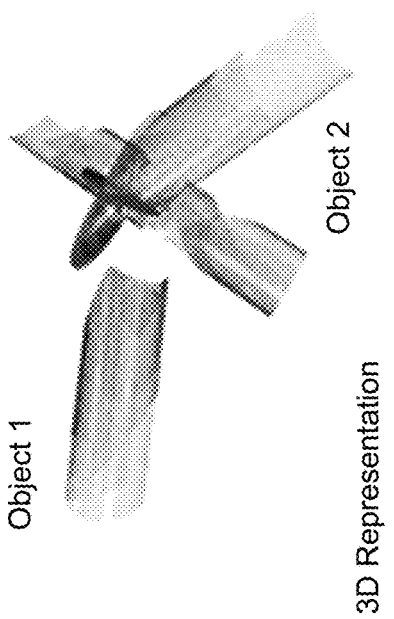

With reference to 540 of the method 500, in some implementations where the objects 322 and 332—at the fixed relative pose—are physically touching each other, the method 500 may move to 550. In some implementations where the objects 322 and 332—at the fixed relative pose—are physically not touching each other, the robot system 300, at 540, may use a part fit-up approach to bring the objects 322 and 332 together such that they touch each other. In some implementations, the part fit-up approach includes using a visual servoing approach. The visual servoing approach may use feedback information extracted from a vision sensor (such as the one or more sensors in the workspace 302) to control the motion of at least one of the robots (e.g., the robot 331 including the robotic arms 335) carrying an object (e.g., object 332). The visual servoing approach may include performing the registration processes (as described above) to the objects while they are in space. In operation, after picking the target objects and positioning them closer to each other (while they are not touching), the controller 308 may instruct the sensors (either static sensors on the frames or the sensors coupled to a robotic arm) to rescan the objects. The rescanning process may include capturing one or more images of the picked up object from multiple different angles. The captured data may be combined to generate a composite scan on which the above-described registration technique may be employed. The re-application of the registration process for part fit-up may use the composite scan instead of the 3D representation of the target object generated after the initial scan. The re-application of the registration technique may provide controller 308 a more accurate view of the reality. Referring to FIG. 12, FIG. 12 includes images of an example of a registration process according to one or more aspects. For example, FIG. 12 includes a first image of a 3D representation prior to the registration process and a second image of the 3D representation after the registration process.

Referring again to FIG. 5, after the re-application of the registration process, the controller 308 may instruct the picking robots to bring the objects closer to one another. In some implementations, the registration process may be applied iteratively so as to improve the accuracy of part fit-up. Referring to FIG. 13, FIG. 13 includes images of another example of a registration process according to one or more aspects. For example, FIG. 13 includes a first image of a 3D representation prior to the registration process and a second image of the 3D representation after the registration process. For example, FIG. 13 includes a first image (the left image) of a 3D representation after a registration process and a second image (the right image) after another registration process is performed after generation of the first image. Accordingly, the robot system 300 may perform the registration process multiple times before the objects touch one another.

Referring again to FIG. 5, in some implementations, in addition to visual servoing, force servoing may be implemented by the robot system 300. For example, the force servoing may be implemented based on a determination by the controller 308 (e.g., using images captured by sensors in the workspace 302) that the objects are in contact with each other. The iterations related to visual servoing can be fixed.

During re-application of the registration, or even during initial application of the registration process, the controller 308 may determine the proper locations from which the sensors in the workspace 302 should capture images of the objects based on a scan optimization technique. In other words, the goal of the scan optimization technique is to find a series of camera positions (or end effector positions) to provide optimal visual information. Explicitly, the controller 308, given a discrete set of camera locations, finds the best location to maximize a visual score function. As the controller 308 runs iterations of scan optimization, the controller 308 may keep track of what has actually been seen. This informs the controller 308 future actions about where to go next, conditioned on prior estimates. In some implementations, a first step may be to determine a finite number of valid (based on kinematic and collision analysis) camera locations or end effector positions. A second step may include implementing a simulation of the visual information from that location, which can be achieved via hidden point removal, ray casting, realistic rendering, etc. The second step may produce an estimate of visual data from the proposed camera or end effector position. Next, the visual data from each proposed location is scored.

Given the visual data produces a scalar value representing the importance of that data relative to what has been seen previously. The controller 308 may then calculate a difference score between the proposed coverage p and what has actually been seen so far, a:difference(a, p). The controller 308 may then perform a scoring operation on the point cloud difference to produce an information gain score, which reflects how much new information do the controller 308 expect to gain from visiting this new location. The gain score may then be used to finalize the positions or locations of the sensors.

With reference to 550 of the method 500, the objects may be in physical contact with each other, and the robot system 300 may perform welding based on a weld plan. Before welding is performed, the welding tool, using the welding robot, may be brought to the locations at which welding is to be performed. As the TCP of the welding tool is known, and the weld plan (e.g., tack positions and their coordinates) can be determined using the annotation information in the CAD model, the TCP of the welding tool may be brought to the weld coordinates to perform welding.

In some implementations, the CAD model may include seam annotations. For example, the CAD model may annotate the seam. In other implementations, the seam may be determined by using one or more images captured by the sensors in the workspace 302. For example, the controller 308 may use the 3D representations to identify a seam. In some examples, the registration techniques described above may be useful to compare and match the seams determined using sensors to those annotated in the CAD model.

In some implementations, following identification of the seam, the controller 308 may automatically generate a weld path for the seam. In determining the weld path, the controller 308 may generate multiple points that denote the seam. In some implementations, path planning entails determining a different state of the welding robot for each such point along a given seam. A state of the robot may include, for example, a position of the robot within the workspace 302 and a specific configuration of the arm of the robot in any number of degrees of freedom that may apply. For instance, for a robot that has an arm having six degrees of freedom, a state for the robot would include not only the location of the robot in the workspace 302 (e.g., the location of the weld head of the robot in three-dimensional, x-y-z space), but it would also include a specific sub-state for each of the robot arm's six degrees of freedom. Furthermore, when the robot transitions from a first state to a second state, it may change its location within the workspace 302, and in such a case, the robot necessarily would traverse a specific path within the workspace 302 (e.g., along a seam being welded). Thus, specifying a series of states of the robot necessarily entails specifying the path along which the robot will travel within the workspace 302.

In some implementations, at each point of the seam, the controller 308 may determine whether the robot can exist in a feasible state at a given point, meaning at least in part that the controller 308 may determine whether implementing the chain of states along the sequence of seam points of the seam will cause any collisions between the robot and structures in the workspace 302, or even with parts of the robot itself. To this end, the concept of realizing different states at different points of a seam may alternatively be expressed in the context of a seam that has multiple waypoints. First, the controller 308 may discretize an identified seam into a sequence of waypoints. A waypoint may constrain an orientation of the weld head connected to the robot in three (spatial or translational) degrees of freedom. Typically, constraints in orientation of the weld head of the robot are provided in one or two rotational degrees of freedom about each waypoint, for the purpose of producing some desired weld of some quality; the constraints are typically relative to the surface normal vectors emanating from the waypoints and the path of the weld seam. For example, the position of the weld head can be constrained in x-, y-, and z-axes, as well as about one or two rotational axes perpendicular to an axis of the weld wire or tip of the welder, all relative to the waypoint and some nominal coordinate system attached to it. These constraints in some examples may be bounds or acceptable ranges for the angles. Those skilled in the art will recognize that the ideal or desired weld angle may vary based on part or seam geometry, the direction of gravity relative to the seam, and other factors. In some examples, the controller 308 may constrain in 1F or 2F weld positions to ensure that the seam is perpendicular to gravity for one or more reasons (such as to find a balance between welding and path planning for optimization purposes). The position of the weld head can therefore be held (constrained) by each waypoint at any suitable orientation relative to the seam. Typically, the weld head will be unconstrained about a rotational axis (0) coaxial with an axis of the weld head. For instance, each waypoint can define a position of the weld head of the tool 310 of the robot 301 (e.g., a welding robot) such that at each waypoint, the weld head is in a fixed position and orientation relative to the weld seam. In some implementations, the waypoints are discretized finely enough to make the movement of the weld head substantially continuous.

The controller 308 may divide each waypoint into multiple nodes. Each node can represent a possible orientation of the weld head at that waypoint. As a non-limiting example, the weld head can be unconstrained about a rotational axis coaxial with the axis of the weld head such that the weld head can rotate (e.g., 360 degrees) along a rotational axis 0 at each waypoint. Each waypoint can be divided into 20 nodes, such that each node of each waypoint represents the weld head at 18 degree of rotation increments. For instance, a first waypoint-node pair can represent rotation of the weld head at 0 degrees, a second waypoint-node pair can represent rotation of the weld head at from 18 degrees, a third waypoint-node pair can represent rotation of the weld head at 36 degrees, etc. Each waypoint can be divided into 2, 10, 20, 60, 120, 360, or any suitable number of nodes. The subdivision of nodes can represent the division of orientations in more than 1 degree of freedom. For example, the orientation of the welder tip about the waypoint can be defined by 3 angles. A weld path can be defined by linking each waypoint-node pair. Thus, the distance between waypoints and the offset between adjacent waypoint nodes can represent an amount of translation and rotation of the weld head as the weld head moves between node-waypoint pairs.

The controller 308 can evaluate each waypoint-node pair for feasibility of welding. For instance, consider the non-limiting example of dividing waypoint into 20 nodes. The controller 308 can evaluate whether the first waypoint-node pair representing the weld head held at 0 degrees would be feasible. Put differently, the controller 308 can evaluate whether the robot 301 would collide or interfere with the part, the fixture, or the welding robot itself, if placed at the position and orientation defined by that waypoint-node pair. In a similar manner, the controller 308 can evaluate whether the second waypoint-node pair, third waypoint-node pair, etc., would be feasible. The controller 308 can evaluate each waypoint similarly. In this way, all feasible nodes of all waypoints can be determined.

In some implementations, a collision analysis as described herein may be performed by comparing a 3D model of the workspace 302 and a 3D model of the robot 301 to determine whether the two models overlap, and optionally, some or all of the triangles overlap. If the two models overlap, the controller 308 may determine that a collision is likely. If the two models do not overlap, the controller 308 may determine that a collision is unlikely. More specifically, in some examples, the controller 308 may compare the models for each of a set of waypoint-node pairs (such as the waypoint-node pairs described above) and determine that the two models overlap for a subset, or even possibly all, of the waypoint-node pairs. For the subset of waypoint-node pairs with respect to which model intersection is identified, the controller 308 may omit the waypoint-node pairs in that subset from the planned path and may identify alternatives to those waypoint-node pairs. The controller 308 may repeat this process as needed until a collision-free path has been planned. The controller 308 may use a flexible collision library (FCL), which includes various techniques for efficient collision detection and proximity computations, as a tool in the collision avoidance analysis. The FCL is useful to perform multiple proximity queries on different model representations, and it may be used to perform probabilistic collision identification between point clouds. Additional or alternative resources may be used in conjunction with or in lieu of the FCL.

The controller 308 can generate one or more feasible weld paths should they physically be feasible. A weld path can be a path that the welding robot takes to weld the candidate seam. In some examples, the weld path may include all the waypoints of a seam. In some examples, the weld path may include some but not all the waypoints of the candidate seam. The weld path can include the motion of the robot and the weld head as the weld head moves between each waypoint-node pair. Once a feasible path between node-waypoint pairs is identified, a feasible node-waypoint pair for the next sequential waypoint can be identified should it exist. Those skilled in the art will recognize that many search trees or other strategies may be employed to evaluate the space of feasible node-waypoint pairs. As discussed in further detail herein, a cost parameter can be assigned or calculated for movement from each node-waypoint pair to a subsequent node-waypoint pair. The cost parameter can be associated with a time to move, an amount of movement (e.g., including rotation) between node-waypoint pairs, or a simulated or expected weld quality produced by the weld head during the movement.

Based on the generated weld paths, the controller 308 can optimize the weld path for welding. As used herein optimal and optimize do not refer to determining an absolute best weld path, but generally refers to techniques by which weld time can be decreased or weld quality improved relative to less efficient weld paths. For example, the controller 308 can determine a cost function that seeks local or global minima for the motion of the robot 301. Typically, the optimal weld path minimizes weld head rotation, as weld head rotation can increase the time to weld a seam or decrease weld quality. Accordingly, optimizing the weld path can include determining a weld path through a maximum number of waypoints with a minimum amount of rotation.

Although shown and described as using a single welding torch, the number of welding robots may vary. For example, in some implementations, multiple robots having a welding tool (attached thereto) may be used to perform the welding task. In such scenarios, the multiple welding tools may be brought close to the objects when they are in their fixed relative position. The controller 308 may use the technique described with reference to 550 of the method 500 to bring each one of the multiple welding tools at their desired positions. In such scenarios, controller 308 may employ a different welding plan for each one of the multiple welding tools. For example, one of the welding robots may perform tack welds while the other welding robot may perform a different kind of weld (e.g., full seam welds). In some implementations, multiple welding robots may perform the same kind of welds but focus on welding different positions on the object.

Following the completion of the welding process, either one of the picking robots may carry and drop-off the assembled objects to a positioner, such as the positioners 355, 365, or another positioner.

As noted above, FIGS. 3 and 4 illustrate a 4-robot system, however, the number of robots may vary in that an assembly task may be performed by even a one-robot system. For example, the robot system 100, 200, or 300 may include one robot having a picking tool coupled thereto. In such implementations, a first target object may be positioned on a positioner and a second object may be positioned on the same positioner or a different positioner. A robot may be configured to locate, identify, and pick the first target object using the techniques described above. The robot may then manipulate the first object's pose and bring the object closer to the second object using the techniques described above. In such implementations, the second object may be affixed to the positioner (e.g., using clamps) and the positioner may be configured to change the pose of the second object. In some implementations, the positioner may change the pose of the second object using some of the principles discussed above. For example, when the picking robot brings the picked-up object closer to the second object, the positioner (which can be actuated to move or rotate) may change the pose of the second object in coordination with the picked-up object to bring the first and second objects to a fixed pose relative to each other. In such implementations, the welding tool may be static (e.g., it does not move) and the robot and positioner may perform coordinated motion while keeping the objects in the fixed pose to bring the objects closer to the welding tool. As the robot and the positioner change the pose of the objects while keeping the objects in the fixed pose relative to each other, the welding tool may perform welding according to a weld plan.

In some implementations, the assembly task may be performed by a two-robot system. For example, the robot system 100, 200, or 300 may include two robots each having a picking tool coupled thereto. In such implementations, a first target object may be positioned on a positioner and a second object may be positioned on the same positioner or a different positioner. Both the robots may be configured to locate, identify, and pick their respective objects (e.g., one robot picks up the first object and the second robot picks up the second object). In picking the objects, both robots may use the techniques described above. The robot may then coordinatively manipulate the picked up objects' poses and bring them in a fixed relative pose. In such implementations, the welding tool may be static (e.g., it does not move) and the robots may bring the objects closer to the welding tool to facilitate welding on the object. For example, the robots change the pose of the objects while keeping the objects in the fixed pose relative to each other, and the welding tool may perform welding according to a weld plan.

In some implementations, the assembly task may be performed by a three-robot system. For example, a robot system 300 may include two robots each having a picking tool coupled thereto. In such implementations, a first target object may be positioned on a positioner and a second object may be positioned on the same positioner or a different positioner. Both the robots may be configured to locate, identify, and pick their respective objects (e.g., one robot picks up the first object and the second robot picks up the second object). In picking the objects, both robots may use the techniques described above. The robot may then coordinatively manipulate the picked up objects' poses and bring them to a fixed relative pose. In a three-robot system, the welding tool may be coupled to a third robot (similar to the embodiment described in FIGS. 3 and 4). Similar to the description of FIGS. 3 and 4, the welding tool can be brought to the picked up objects, and the welding tool may perform welding according to a weld plan.

The picking robots pick the target objects and manipulate their poses. The welding robot manipulates the pose of the welding tool. The sensing robot manipulates the pose of the one or more sensors. These robots, in essence, manipulate the pose of bodies, such as an object, a sensor, and the like. Accordingly, in some implementations, these robots may be referred to as pose manipulators or pose manipulation tools. For example, robot 301 may be referred to as a pose manipulation tool that has a welding tool coupled thereto. Similarly, the robot 311 may be referred to as a pose manipulation tool that has a picking tool coupled thereto, thereby making the pose manipulation tool configured to pick an object and change its pose. The same idea of pose manipulation applies to the robots 321 and 331.

Figure 15:
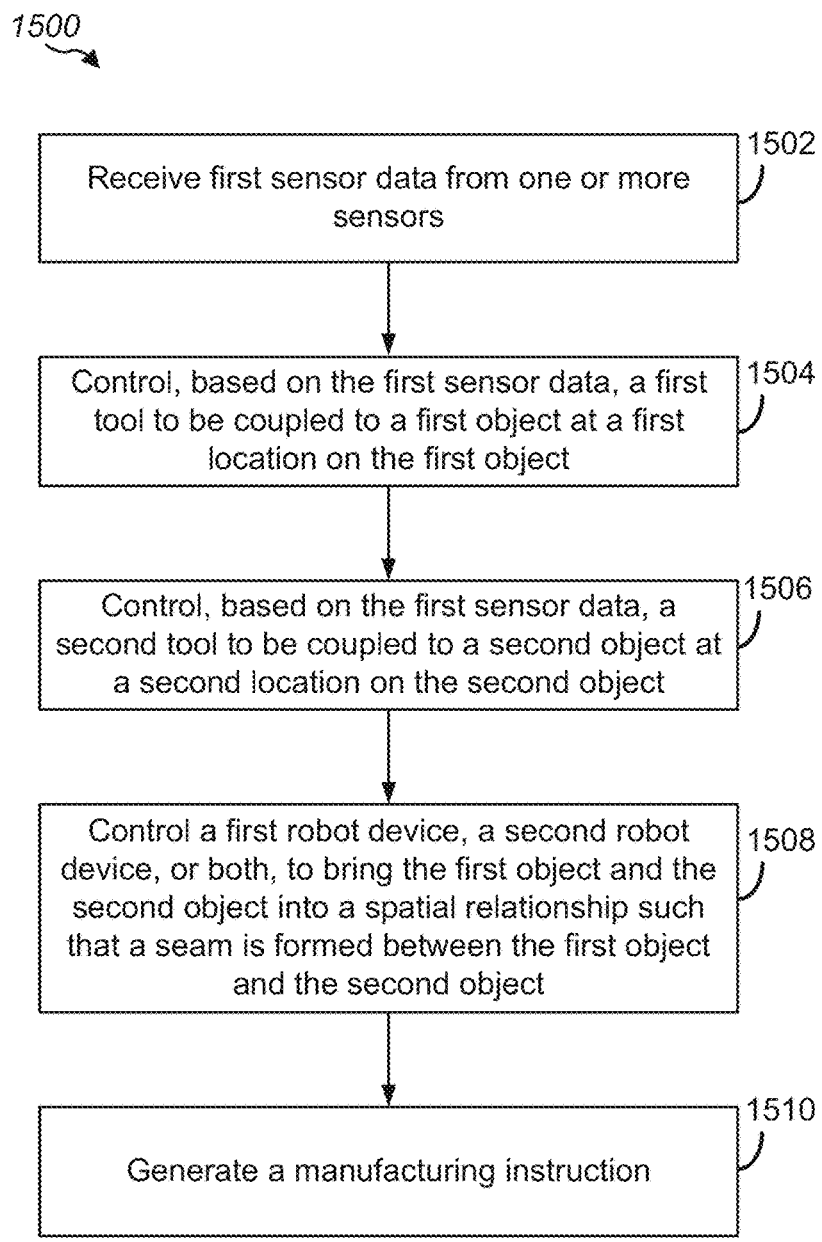
FIG. 15 is a flow diagram illustrating an example process of operating a robot assembly system according to one or more aspects.

Referring to FIG. 15, FIG. 15 is a flow diagram illustrating an example process (e.g., a method 1500) of operating a robot assembly system. The method 1500 disclosed in FIG. 15 may be performed by a robot system, such as the robot system 100, 200 (e.g., the control device 150), or the robot system 300 (e.g., the controller 308). In some implements, the robot system including a first tool coupled to a first robot device, a second tool coupled to a second robot device, one or more sensors, a weld tool, and a controller. The first tool may include or correspond to the first tool 120 coupled to the first robot device 110, or tool 320 coupled to the robot 311. The second tool may include or correspond to the second tool 222 coupled to the second robot device 212, or tool 340 couple to the robot 331. The one or more sensors may include or correspond to the sensor 130, the first sensor 234, the second sensor 236, the sensor 330, or the one or more of sensors 351, 352, 361, 362. The weld tool may include or correspond to the manufacturing tool 126 or the tool 310. The controller may include or correspond to the controller device 150, the controller 152, the weld controller 307, the controller 308, or the database 312.

The method 1500 may include, at 1502, the controller receiving first sensor data from the one or more sensors. For example, the first sensor data may include or correspond to the sensor data 180. In some implementations, the first sensor data includes image data.

At 1504, the method 1500 includes the controller controlling, based on the first sensor data, a first tool to be coupled to a first object at a first location on the first object. The first object may include or correspond to the first object 140 or the object 322. To control the first tool, the controller may generate and send the control information 182.

At 1506, the method 1500 includes the controller controlling, based on the first sensor data, the second tool to be coupled to a second object at a second location on the second object. The second object may include or correspond to the second object 142 or the object 332. To control the second tool, the controller may generate and send the control information 182.

At 1508, the method 1500 includes the controller controlling the first robot device, the second robot device, or both, to bring the first object and the second object into a spatial relationship such that a seam is formed between the first object and the second object. The seam may include or correspond to the seam 144.

At 1510, the method 1500 includes the controller generating a manufacturing instruction. For example, the manufacturing instruction may include a weld instruction. In some implementation, the controller may send or execute the manufacturing instruction. To illustrate, when the manufacturing instruction includes the weld instruction, the weld instruction may be executed to cause the weld tool to weld the seam to couple the first object and the second object together. To weld the seam, the weld tool may lay a weld metal along the seam to couple the first object and the second object together. In some implementation, the controller may send the manufacturing instruction to a weld controller, such as the weld controller 307, for execution.

In some implementations, the method 1500 may include the controller receiving model data associated with a computer aided design (CAD) model of a representation of a structure including the first object and the second object. The model data may include or correspond to the model information 164, the manufacturing information 176, or the threshold 177. The controller may also identify the first object based on the first sensor data, the model data, or a combination thereof. Additionally, or alternatively, the controller may perform, based on the model data, the first sensor data, or a combination thereof, a registration process to determine a first pose of the first object. In some implementations, the controller may generate a first 3D representation of the first object based on the first sensor data and may perform the registration process, based on the first 3D representation, to generate a second 3D representation of the first object. To perform the registration process, the controller may execute the registration logic 173.

In some implementations, the controller may determine the first location on the first object based on the first pose of the first object. Additionally or alternatively, the controller may determine the first location based on the first 3D representation, the second 3D representation, the model data, or a combination thereof. In some implementations, the controller may perform, based on the first location, a reachability analysis, a collision analysis, or a combination thereof. To perform the reachability analysis or a collision analysis, the controller may execute the Kinematic reachability and collision logic 174.

In some implementations, after the first tool is coupled to the first object, the controller receives, from the one or more sensors, second sensor data associated with the first object coupled to the first tool. The controller may perform, based on the model data and the second sensor data, the registration process to determine a second pose of the first object. To perform the registration process, the controller may execute the registration logic 173.

In some implementations, after the first object and the second object are brought into the spatial relationship, the controller receives, from the one or more sensors, third sensor data associated with the first object and the second object. The controller may determine, based on the model data and the third sensor data, whether a separation between the first object and the second object is less than or equal to a threshold. For example, the threshold may include or correspond to the threshold 177.

Implementations described above generally relate to robots configured to autonomously perform assembly tasks. A semi-autonomous or autonomous welding robot, typically has capabilities that include, but are not limited to the inclusion of sensors to scan some given object(s), algorithms in the form of software that automatically identify and locate objects that are to be welded, and algorithms in the form of machine-readable code to control the motion of the robot(s) to pick the objects, and algorithms in the form of machine readable code to control the motion of the robot(s) and perform welding. The algorithms in the form of machine readable code may also be configured to control any other devices such as motorized positioners, in order to change the pose of objects in order to perform welding. Additionally, or alternatively, a semi-autonomous or autonomous welding robot may also have capabilities that include, but are not limited to the inclusion of sensors to scan some given object(s), algorithms in the form of software that automatically recognize, localize, and register a given model of the object(s) where the objects may have already been denoted (or annotated) in some way (e.g., tack welding positions may be annotated) perhaps in the given model itself, and algorithms in the form of software to automatically program the motion of the robot(s), the control of the picking robots, welding robots, and any other devices such a motorized positioner, in order to weld the seams correctly or as desired.

It is noted that semi-autonomous or autonomous robots may have these above-described abilities only in part, and where some user given or selected parameters may be required, or user involvement may be necessary in other ways, such as placing the objects on the positioner(s), or providing annotations on models (e.g., computer aided design (CAD) models).

While various implementations have been described above, it should be understood that they have been presented by way of example only, and not limitation. Although various implementations have been described as having particular features and/or combinations of components, other implementations are possible having a combination of any features and/or components from any of the examples where appropriate as well as additional features and/or components. For example, although not described in detail above, in some implementations, methods of determining a shape of a portion of a part may include a calibration phase during which distortion of the detector(s), the lens(es) on the detector(s), the distortion in the combination of detector(s) and lens(es), and/or the relative position of the camera(s) to a test surface or fixture onto which a pattern(s) is projected are determined.

Certain features that are described in this specification in the context of separate implementations also can be implemented in combination in a single implementation. Conversely, various features that are described in the context of a single implementation also can be implemented in multiple implementations separately or in any suitable subcombination. Where methods described above indicate certain events occurring in certain order, the ordering of certain events may be modified. Additionally, certain of the events may be performed concurrently in a parallel process when possible, as well as performed sequentially as described above.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one more example processes in the form of a flow diagram. However, other operations that are not depicted can be incorporated in the example processes that are schematically illustrated. For example, one or more additional operations can be performed before, after, simultaneously, or between any of the illustrated operations. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products. Additionally, some other implementations are within the scope of the following claims. In some cases, the actions recited in the claims can be performed in a different order and still achieve desirable results.

Those of skill in the art would understand that information, message, and signals may be represented using any of a variety of different technologies and techniques. For example, data, instructions, commands, information, and signals that may be referenced throughout the above description may be represented by voltages, currents, electromagnetic waves, magnetic fields or particles, optical fields or particles, or any combination thereof.

Components, the functional blocks, and the modules described herein with the figures include processors, electronics devices, hardware devices, electronics components, logical circuits, memories, software codes, firmware codes, among other examples, or any combination thereof. Software shall be construed broadly to mean instructions, instruction sets, code, code segments, program code, programs, subprograms, software modules, application, software applications, software packages, routines, subroutines, objects, executables, threads of execution, procedures, or functions, among other examples, whether referred to as software, firmware, middleware, microcode, hardware description language or otherwise. In addition, features discussed herein may be implemented via specialized processor circuitry, via executable instructions, or combinations thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. The various illustrative logics, logical blocks, modules, circuits and algorithm processes described in connection with the implementations disclosed herein may be implemented as electronic hardware, computer software, or combinations of both. In one or more aspects, the functions described may be implemented in hardware, digital electronic circuitry, computer software, firmware, including the structures disclosed in this specification and their structural equivalents thereof, or in any combination thereof. Implementations of the subject matter described in this specification also can be implemented as one or more computer programs, that is one or more modules of computer program instructions, encoded on a computer storage media for execution by, or to control the operation of, data processing apparatus.

The hardware and data processing apparatus used to implement the various illustrative logics, logical blocks, modules and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, or, any conventional processor, controller, microcontroller, or state machine. In some implementations, a processor may be implemented as a combination of computing devices, such as a combination of a DSP and a microprocessor, a plurality of microprocessors, one or more microprocessors in conjunction with a DSP core, or any other such configuration. In some implementations, particular processes and methods may be performed by circuitry that is specific to a given function.

If implemented in software, the functions may be stored on or transmitted over as one or more instructions or code on a computer-readable medium. The processes of a method or algorithm disclosed herein may be implemented in a processor-executable software module which may reside on a computer-readable medium. Computer-readable media includes both computer storage media and communication media including any medium that can be enabled to transfer a computer program from one place to another. A storage media may be any available media that may be accessed by a computer. By way of example, and not limitation, such computer-readable media may include RAM, ROM, EEPROM, CD-ROM or other optical disk storage, magnetic disk storage or other magnetic storage devices, or any other medium that may be used to store desired program code in the form of instructions or data structures and that may be accessed by a computer. Also, any connection can be properly termed a computer-readable medium. Additionally, the operations of a method or algorithm may reside as one or any combination or set of codes and instructions on a machine readable medium and computer-readable medium, which may be incorporated into a computer program product.

Some implementations described herein relate to methods or processing events. It should be understood that such methods or processing events can be computer-implemented. That is, where a method or other events are described herein, it should be understood that they may be performed by a compute device having a processor and a memory. Methods described herein can be performed locally, for example, at a compute device physically co-located with a robot or local computer/controller associated with the robot and/or remotely, such as on a server and/or in the "cloud."

Memory of a compute device is also referred to as a non-transitory computer-readable medium, which can include instructions or computer code for performing various computer-implemented operations. The computer-readable medium (or processor-readable medium) is non-transitory in the sense that it does not include transitory propagating signals per se (e.g., a propagating electromagnetic wave carrying information on a transmission medium such as space or a cable). The media and computer code (also can be referred to as code) may be those designed and constructed for the specific purpose or purposes. Examples of non-transitory computer-readable media include, but are not limited to: magnetic storage media such as hard disks, floppy disks, and magnetic tape; optical storage media such as Compact Disc/Digital Video Discs (CD/DVDs), Compact Disc-Read Only Memories (CD-ROMs), and holographic devices; magneto-optical storage media such as optical disks; carrier wave signal processing modules, Read-Only Memory (ROM), Random-Access Memory (RAM) and/or the like. One or more processors can be communicatively coupled to the memory and operable to execute the code stored on the non-transitory processor-readable medium. Examples of processors include general purpose processors (e.g., CPUs), Graphical Processing Units, Field Programmable Gate Arrays (FPGAs), Application Specific Integrated Circuits (ASICs), Digital Signal Processor (DSPs), Programmable Logic Devices (PLDs), and the like. Examples of computer code include, but are not limited to, micro-code or micro-instructions, machine instructions, such as produced by a compiler, code used to produce a web service, and files containing higher-level instructions that are executed by a computer using an interpreter. To illustrate, examples may be implemented using imperative programming languages (e.g., C, Fortran, etc.), functional programming languages (Haskell, Erlang, etc.), logical programming languages (e.g., Prolog), object-oriented programming languages (e.g., Java, C++, etc.) or other suitable programming languages and/or development tools. Additional examples of computer code include, but are not limited to, control signals, encrypted code, and compressed code.

As used herein, various terminology is for the purpose of describing particular implementations only and is not intended to be limiting of implementations. For example, as used herein, an ordinal term (e.g., "first," "second," "third," etc.) used to modify an element, such as a structure, a component, an operation, etc., does not by itself indicate any priority or order of the element with respect to another element, but rather merely distinguishes the element from another element having a same name (but for use of the ordinal term). The term "coupled" is defined as connected, although not necessarily directly, and not necessarily mechanically; two items that are "coupled" may be unitary with each other. The terms "a" and "an" are defined as one or more unless this disclosure explicitly requires otherwise.

The term "about" as used herein can allow for a degree of variability in a value or range, for example, within 10%, within 5%, or within 1% of a stated value or of a stated limit of a range, and includes the exact stated value or range. The term "substantially" is defined as largely but not necessarily wholly what is specified (and includes what is specified; e.g., substantially 90 degrees includes 90 degrees and substantially parallel includes parallel), as understood by a person of ordinary skill in the art. In any disclosed implementation, the term "substantially" may be substituted with "within [a percentage] of" what is specified, where the percentage includes 0.1, 1, or 5 percent; and the term "approximately" may be substituted with "within 10 percent of" what is specified. The statement "substantially X to Y" has the same meaning as "substantially X to substantially Y," unless indicated otherwise. Likewise, the statement "substantially X, Y, or substantially Z" has the same meaning as "substantially X, substantially Y, or substantially Z," unless indicated otherwise. Unless stated otherwise, the word or as used herein is an inclusive or and is interchangeable with "and/or," such that when "or" is used in a list of two or more items, means that any one of the listed items can be employed by itself, or any combination of two or more of the listed items can be employed. To illustrate, A, B, or C includes: A alone, B alone, C alone, a combination of A and B, a combination of A and C, a combination of B and C, or a combination of A, B, and C. Similarly, the phrase "A, B, C, or a combination thereof" or "A, B, C, or any combination thereof" includes: A alone, B alone, C alone, a combination of A and B, a combination of A and C, a combination of B and C, or a combination of A, B, and C.

Throughout this document, values expressed in a range format should be interpreted in a flexible manner to include not only the numerical values explicitly recited as the limits of the range, but also to include all the individual numerical values or sub-ranges encompassed within that range as if each numerical value and sub-range is explicitly recited. For example, a range of "about 0.1% to about 5%" or "about 0.1% to 5%" should be interpreted to include not just about 0.1% to about 5%, but also the individual values (e.g., 1%, 2%, 3%, and 4%) and the sub-ranges (e.g., 0.1% to 0.5%, 1.1% to 2.2%, 3.3% to 4.4%) within the indicated range.

The terms "comprise" (and any form of comprise, such as "comprises" and "comprising"), "have" (and any form of have, such as "has" and "having"), "include" (and any form of include, such as "includes" and "including"), and "contain" (and any form of contain, such as "contains" and "containing"). As a result, an apparatus that "comprises," "has," "includes," or "contains" one or more elements possesses those one or more elements, but is not limited to possessing only those one or more elements. Likewise, a method that "comprises," "has," "includes," or "contains" one or more steps possesses those one or more steps, but is not limited to possessing only those one or more steps.

Any implementation of any of the systems, methods, and article of manufacture can consist of or consist essentially of—rather than comprise/have/include—any of the described steps, elements, or features. Thus, in any of the claims, the term "consisting of" or "consisting essentially of" can be substituted for any of the open-ended linking verbs recited above, in order to change the scope of a given claim from what it would otherwise be using the open-ended linking verb. Additionally, the term "wherein" may be used interchangeably with "where".

Further, a device or system that is configured in a certain way is configured in at least that way, but it can also be configured in other ways than those specifically described. The feature or features of one implementation may be applied to other implementations, even though not described or illustrated, unless expressly prohibited by this disclosure or the nature of the implementations.

The claims are not intended to include, and should not be interpreted to include, means- plus- or step-plus-function limitations, unless such a limitation is explicitly recited in a given claim using the phrase(s) "means for" or "step for," respectively.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure and following claims are not intended to be limited to the examples and designs described herein but is to be accorded the widest scope consistent with the principles and novel features disclosed herein.

The invention claimed is:

1. An assembly robotic system, comprising:
a first robot device positioned in a workspace;
a first tool coupled to the first robot device, the first tool configured to be selectively coupled to a first object;
one or more sensors, each sensor of the one or more sensors configured to generate sensor data associated with the workspace;
a welding tool configured to couple two or more objects together; and
a controller configured to:
based on the sensor data, determine a pose in which the first object is positioned in the workspace, wherein the pose includes a location information of the first object within the workspace, and an orientation information of the first object within the workspace;
based on the pose of the first object, identify a grasp location on the first object for the first object to be coupled with the first tool for pose manipulation, wherein the grasp location is identified by the controller from multiple possible grasp locations on the first object identified by the controller, based upon performing collision analyses by the controller on the multiple possible grasp locations;
control the first tool to be coupled to the first object at the grasp location;
control the first robot device to bring the first object into a spatial relationship with a second object such that a seam is formed between the first object and the second object; and
generate a weld instruction to cause the weld tool to weld the seam to couple the first object and the second object together while the first tool is coupled to the first object at the grasp location,
wherein the collision analyses comprise determining, by the controller, if the first robot device would encounter a collision in the workspace when accessing the multiple possible grasp locations and if the weld tool would encounter a collision in the workspace when welding the seam while the first tool is coupled to the first object at the multiple possible grasp locations.

2. The assembly robotic system of claim 1, wherein:
the first robot device includes a first robotic arm;
the sensor data generated by at least one sensor of the one or more sensors includes image data; and
the controller is further configured to:
after identification of the grasp location, assign a coordinate frame value to the first object;
control the first tool to be coupled, based on the coordinate frame value, to the first object at the grasp location on the first object; and
control the first tool, the first robotic arm, or a combination thereof, to adjust the pose of the first object.

3. The assembly robotic system of claim 1, further comprising:
a second robot device positioned in the workspace; and
a second tool coupled to the second robot device, the second tool configured to be selectively coupled to the second object,
wherein the controller is further configured to:
control the second tool to be coupled to the second object based on the sensor data; and
control the second robot device to bring the second object into the spatial relationship with the first object such that the seam is formed between the first object and the second object.

4. The assembly robotic system of claim 3, wherein the controller is further configured to control the first robot device, the first tool, the second robot device, the second tool, or a combination thereof, to change the pose of the first object and the second object while the first object and the second object are in the spatial relationship.

5. The assembly robotic system of claim 1, further comprising:
a second robot device positioned in the workspace, and wherein:
a first sensor of the one or more sensors is coupled to the second robot device;
the sensor data generated by the first sensor includes first image data; and
the controller is further configured to control the first tool to be coupled to the first object based on the first image data.

6. The assembly robotic system of claim 5, wherein the controller is further configured to, after the first tool is coupled to the first object:
control the second robot device to bring the first sensor closer to the first object; and
receive additional sensor data from the first sensor, the additional sensor data includes additional image data associated with the first object coupled to the first tool.

7. The assembly robotic system of claim 1, further comprising:
a second robot device positioned in the workspace, and wherein:
the weld tool is coupled to the second robot device;
the controller is further configured to control the second robot device to position the weld tool adjacent to the first object and the second object; and
the weld tool is configured to, based on the weld instruction, lay a weld metal along the seam to couple the first object and the second object together.

8. The assembly robotic system of claim 7, wherein:
the controller is configured to receive data that is associated with a computer aided design (CAD) model of a representation of a structure including the first object and the second object; and
the CAD model:
indicates the spatial relationship of the first object and the second object;
includes annotations associated with the seam; or
a combination thereof.

9. The assembly robotic system of claim 8, wherein the controller is further configured to:
determine a first location of the seam based on a user input, the annotations included in the CAD model, or a combination thereof; and
control the second robot device such that the welding tool is positioned with respect to the first location of the seam.

10. The assembly robotic system of claim 1, further comprising:
a positioner device configured to host the first object, wherein the positioner device is configured to adjust the pose of the first object while the first object is hosted by the positioner device, and
wherein the controller is configured to control the first tool, the first robot device, or a combination thereof to adjust the pose of the first object while the first object is held by the first tool.

11. The assembly robotic system of claim 1, wherein the controller is configured to:
identify, based on the sensor data, each possible grasp location of the multiple possible grasp locations on the first object;
for each possible grasp location of the multiple possible grasp locations on the first object, perform a reachability analysis, and
to identify the grasp location on the first object from the multiple possible grasp locations, on the first object based on a result of the reachability analysis.

12. The assembly robotic system of claim 1, wherein the grasp location is identified at least in accordance with a geometric configuration of the first object.

13. The assembly robotic system of claim 1, wherein the collision analyses are performed after feasibility analyses performed by the controller, wherein the feasibility analyses determine whether the first robot device can reach the multiple possible grasp locations.

14. The assembly robotic system of claim 1, wherein the controller is further configured to determine a final grasp pose of the first tool based upon the collision analyses.

15. An assembly robotic system, comprising:
a first robot device positioned in a workspace;
a first tool coupled to the first robot device, the first tool configured to be selectively coupled to a first object;
a second robot device positioned in the workspace;
a second tool coupled to the second robot device, the second tool configured to be selectively coupled to a second object, wherein the first object and the second object configured to form a first seam between the first object and the second object;
a third robot device positioned in the workspace;
one or more sensors configured to generate sensor data associated with the workspace, at least a first sensor of the one or more sensors coupled to the third robot device;
a fourth robot device positioned in the workspace;
a welding tool coupled to the fourth robot device, the welding tool configured to weld the first seam formed between the first object and the second object; and
a controller configured to:
control, based on the sensor data, the first tool to be coupled to the first object at a first grasp location on the first object, wherein the first grasp location is identified by the controller from multiple possible grasp locations on the first object identified by the controller based upon collision logic of the controller, wherein the collision logic determines if the first robot device would encounter a collision in the workspace when accessing the multiple possible grasp locations on the first object and if a weld tool would encounter a collision in the workspace when welding the first seam while the first tool is coupled to the first object at the multiple possible grasp locations on the first object;

control, based on the sensor data, the second tool to be coupled to the second object at a second grasp location on the second object;

control the first robot device, the second robot device, or both, to bring the first object and the second object into a first spatial relationship such that the first seam is formed between the first object and the second object; and generate a weld instruction to cause the weld tool to weld the first seam to couple the first object and the second object together while the first tool is coupled to the first object at the first grasp location.

16. The assembly robotic system of claim 15, wherein:
the workspace includes a three-dimensional space;
the first robot device includes a first robotic arm, the first tool coupled to an end of the first robotic arm;
the second robot device includes a second robotic arm, the second tool coupled to an end of the second robotic arm;
the third robot device includes a third robotic arm, the first sensor coupled to an end of the third robotic arm, the first sensor configured to capture one or more images of the first object, the second object, or a combination there;
the fourth robot device includes a fourth robotic arm, the welding tool coupled to an end of the fourth robotic arm; and
responsive to the weld instruction, the weld tool is configured to weld the first seam according to a weld plan.

17. The assembly robotic system of claim 16, wherein:
the one or more sensors include a second sensor configured to capture a set of one or more images of the first object, the second object, or both, after the first object is coupled to the first tool, the second object is coupled to the second tool, or a combination thereof;
the sensor data generated by the second sensor includes second image data; and
the controller is configured to control, based on the second image data, the first robot device after the first tool is coupled to the first object.

18. The assembly robotic system of claim 16, wherein:
the first tool is configured to be selectively coupled to a third object; and
after the weld metal is laid by the weld tool to couple the first object and the second object together, the controller is further configured to:
control the first tool to be decoupled with the first object and to be coupled to the third object at a third grasp location on the third object;
control the first robot device, the second robot device, or both, to bring the third object into a second spatial relationship with the first object and the second object coupled together such that a second seam is formed between the third object and the first object or the second object; and
generate a second weld instruction to cause the weld tool to weld the second seam to couple the third object to the first object and the second object while the first tool is coupled to the third object at the third grasp location.

19. A method of operating an assembly robotic system including a first tool coupled to a first robot device, a second tool coupled to a second robot device, one or more sensors, a weld tool, and a controller, the method comprising:
receiving, by a controller of an assembly robotic system, first sensor data from the one or more sensors;
identifying, with the controller and based on the first sensor data, a grasp location on the first object for the first object to be coupled with the first tool, wherein the grasp location is identified from multiple possible grasp locations on the first object identified by the controller based upon performing collision analyses with the controller on the multiple possible grasp locations on the first object, wherein the collision analyses comprises determining if the first robot device would encounter a collision when accessing the multiple possible grasp locations on the first object and determining if the weld tool would encounter a collision when welding a seam between the first object and a second object while the first tool is coupled to the first object at the multiple possible grasp locations on the first object;
controlling, by the controller and based on the first sensor data, the first tool to be coupled to the first object at the first grasp location;
controlling, by the controller and based on the first sensor data, the second tool to be coupled to the second object at a second grasp location on the second object;
controlling, by the controller, the first robot device, the second robot device, or both, to bring the first object and the second object into a spatial relationship such that the seam is formed between the first object and the second object;
generating, by the controller, a weld instruction; and
welding, by the weld tool responsive to the weld instruction, the seam to couple the first object and the second object together while the first tool is coupled to the first object at the grasp location.

20. The method of claim 19, further comprising:
receiving, by the controller, model data is associated with a computer aided design (CAD) model of a representation of a structure including the first object and the second object;
identifying, by the controller based on the first sensor data, the first object, the first sensor data including image data;
performing, by the controller based on the model data and the first sensor data, a registration process to determine the first pose of the first object;
determining, by the controller, the first grasp location on the first object based on the first pose of the first object; and
performing, by the controller based on the first grasp location, a reachability analysis, a collision analysis, or a combination thereof.

21. The method of claim 20, further comprising:
after the first tool is coupled to the first object:
receiving, by the controller from the one or more sensors, second sensor data associated with the first object coupled to the first tool; and
performing, by the controller based on the model data and the second sensor data, the registration process to determine a second pose of the first object; and
after the first object and the second object are brought into the spatial relationship:
receiving, by the controller from the one or more sensors, third sensor data associated with the first object and the second object; and
determining, by the controller based on the model data and the third sensor data, whether a separation between the first object and the second object is less than or equal to a threshold.

* * * * *